United States Patent [19]

Bovik et al.

[11] Patent Number: 5,282,255
[45] Date of Patent: Jan. 25, 1994

[54] METHOD AND APPARATUS FOR PROCESSING BOTH STILL AND MOVING VISUAL PATTERN IMAGES

[75] Inventors: Alan C. Bovik, Buda; Dapang Chen, Austin, both of Tex.

[73] Assignee: Board of Regents, The University of Texas System, Austin, Tex.

[21] Appl. No.: 717,214

[22] Filed: Jun. 17, 1991

Related U.S. Application Data

[63] Continuation-in-part of Ser. No. 498,587, Mar. 23, 1990, Pat. No. 5,144,688.

[51] Int. Cl.⁵ ............... G06K 9/36; G06K 9/46; H04N 7/12
[52] U.S. Cl. ................... 382/56; 358/133; 358/433
[58] Field of Search ........... 382/17, 56; 358/133, 358/135, 136, 433; G06K 9/46, 9/66, 9/36; H04N 7/12, 1/04, 1/40

[56] References Cited

U.S. PATENT DOCUMENTS

| | | | |
|---|---|---|---|
| 4,281,312 | 7/1981 | Knudson | 382/56 |
| 4,365,273 | 12/1982 | Yamada et al. | 358/433 |
| 4,567,518 | 1/1986 | Driessen | 358/133 |
| 4,606,069 | 8/1986 | Johnsen | 382/56 |
| 4,668,995 | 5/1987 | Chen et al. | 382/56 |
| 4,691,329 | 9/1987 | Juri et al. | 382/56 |
| 4,692,806 | 9/1987 | Anderson et al. | 382/56 |
| 4,783,841 | 11/1988 | Crayson | 382/56 |
| 4,797,945 | 1/1989 | Suzuki et al. | 382/56 |
| 4,814,871 | 3/1989 | Keesen et al. | 358/133 |
| 4,831,659 | 5/1989 | Miyaoka et al. | 382/56 |
| 4,896,364 | 1/1990 | Lohscheller | 382/22 |
| 4,947,447 | 8/1990 | Miyaoka et al. | 382/56 |
| 5,070,532 | 12/1991 | Faul et al. | 358/433 |
| 5,089,884 | 2/1992 | Suzuki et al. | 358/433 |
| 5,144,688 | 9/1992 | Bovir et al. | 382/56 |

OTHER PUBLICATIONS

Levine, M., "Vision in Man and Machine", McGraw-Hill (1985) pp. 25-57.
Rosenfeld et al., "Digital Picture Processing", Academic Press (1982) pp. 84–112.
Kaufman, "Perception The World Transformed", Oxford University Press (1979) pp. 135–146.

Primary Examiner—Jose L. Couso
Attorney, Agent, or Firm—Arnold, White & Durkee

[57] ABSTRACT

An improved method for coding and decoding still or moving visual pattern images by partitioning images into blocks or cubes, respectively, and coding each image separately according to visually significant responses of the human eye. Coding is achieved by calculating and subtracting a mean intensity value from digital numbers within each block or cube and detecting visually perceivable edge locations within the resultant residual sub-image. If a visually perceivable edge is contained within the block or cube, gradient magnitude and orientation at opposing sides of the edge within each edge block or cube are calculated and appropriately coded. If no perceivable edge is contained within the block or cube, the sub-image is coded as a uniform intensity block. Decoding requires receiving coded mean intensity value, gradient magnitude and pattern code, and then decoding a combination of these three indicia to be arranged in an orientation substantially similar to the original digital image or original sequence of digital images. Coding and decoding can be accomplished in a hierarchical pattern. Further, hierarchical processing can be programmably manipulated according to user-defined criteria.

16 Claims, 12 Drawing Sheets

Fig. 5a $$p_1 \begin{pmatrix} +&+&+&+ \\ -&-&-&- \\ -&-&-&- \\ -&-&-&- \end{pmatrix} \quad p_2 \begin{pmatrix} +&+&+&+ \\ +&+&+&+ \\ -&-&-&- \\ -&-&-&- \end{pmatrix} \quad p_3 \begin{pmatrix} +&+&+&+ \\ +&+&+&+ \\ +&+&+&+ \\ -&-&-&- \end{pmatrix}$$

Fig. 5b $$p_4 \begin{pmatrix} -&-&+&+ \\ -&-&-&+ \\ -&-&-&- \\ -&-&-&- \end{pmatrix} \quad p_5 \begin{pmatrix} -&+&+&+ \\ -&-&+&+ \\ -&-&-&+ \\ -&-&-&- \end{pmatrix} \quad p_6 \begin{pmatrix} +&+&+&+ \\ -&+&+&+ \\ -&-&+&+ \\ -&-&-&+ \end{pmatrix} \quad p_7 \begin{pmatrix} +&+&+&+ \\ +&+&+&+ \\ -&+&+&+ \\ -&-&+&+ \end{pmatrix}$$

Fig. 5c $$p_8 \begin{pmatrix} -&-&-&+ \\ -&-&-&+ \\ -&-&-&+ \\ -&-&-&+ \end{pmatrix} \quad p_9 \begin{pmatrix} -&-&+&+ \\ -&-&+&+ \\ -&-&+&+ \\ -&-&+&+ \end{pmatrix} \quad p_{10} \begin{pmatrix} -&+&+&+ \\ -&+&+&+ \\ -&+&+&+ \\ -&+&+&+ \end{pmatrix}$$

Fig. 5d $$p_{11} \begin{pmatrix} -&-&-&- \\ -&-&-&- \\ -&-&-&+ \\ -&-&+&+ \end{pmatrix} \quad p_{12} \begin{pmatrix} -&-&-&- \\ -&-&-&+ \\ -&-&+&+ \\ -&+&+&+ \end{pmatrix} \quad p_{13} \begin{pmatrix} -&-&-&+ \\ -&-&+&+ \\ -&+&+&+ \\ +&+&+&+ \end{pmatrix} \quad p_{14} \begin{pmatrix} -&-&+&+ \\ -&+&+&+ \\ +&+&+&+ \\ +&+&+&+ \end{pmatrix}$$

| ALGORITHM | I | | II | |
|---|---|---|---|---|
| GRADIENT MAG. MIN. | 30 | | 10 | |
| GRADIENT MAG. MAX. | 30 | | 90 | |
| M | 1 | | 8 | |
| BLOCK TYPE | UNIFORM | EDGE | UNIFORM | EDGE |
| BLOCK TYPE INDICATOR | 1 | 1 | 1 | 1 |
| MEAN INTENSITY | 5 | 3 | 6 | 4 |
| PATTERN INDEX | | 2 | | 3 |
| GRADIENT INDEX | | | | 3 |
| POLARITY INDICATOR | | 1 | | 1 |
| TOTAL BITS | $n_u = 6$ | $n_e = 7$ | $n_u = 7$ | $n_e = 12$ |
| TOTAL BPP | (0.375, 0.4375) | | (0.4375, 0.75) | |
| COMPRESSION RATIOS | (18.29, 21.33) | | (10.67, 18.29) | |

Fig. 6

FRAME: 1 2 3 4  1 2 3 4

METHOD AND APPARATUS FOR PROCESSING BOTH STILL AND MOVING VISUAL PATTERN IMAGES

BACKGROUND OF THE INVENTION

This application is a continuation-in-part of application Ser. No. 498,587, filed Mar. 23, 1990 now U.S. Pat. No. 5,144,688. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

This invention relates to an improved method and apparatus for coding and decoding both still and moving visual pattern images. The present invention can be used to process either a still or a moving visual pattern in either monochrome or color and in real-time.

2. Description of the Related Art

There are numerous methods presently used to code and decode digital images and image sequences (video). Most methods require substantial amounts of computation and are not practical for real-time use. To transmit a digital image, enormous amounts of information must be handled. Conventional coding and decoding techniques often require that digital images be stored in memory and then manipulated in accordance with code and decode algorithms. In a typical 4 MHz television signal with 8 bits per pixel (BPP) of gray-level resolution with a 512×512 pixel array, approximately 2.09 million bits are required to transmit and store a single picture frame. Such a voluminous bit requirement quickly fills most modern computer storage media. With the advent of digital images and the means by which those images can be coded prior to transmission and storage, bit manipulation can be minimized. Two of the more influential and relevant image coding schemes which are presently used are: Block Truncation Coding (BTC) and Vector Quantization (VQ). While there are many others, these two schemes have achieved great notoriety. Both conventional methods are designed to reduce the BPP rate to a level below 1.0. Furthermore, these methods also strive to maintain the quality of the original image with little image distortion.

BTC uses a partitioning scheme whereby an image is truncated into blocks of sub-images. Operations are performed upon each individual block so that the end result is a binary bit stream or code representing that particular block. After each block is coded, the code is transmitted along a conventional transmission media to its target or destination. Upon arriving at the destination, the code is received by a decoder which arranges the decoded image in the same location as the original image.

BTC is fairly simple and fast. Coding is achieved by three basic steps. The first step is computing an average mean intensity value from among all the digital intensity numbers for each partitioned block. Once the mean intensity is computed, the mean is subtracted from each pixel intensity value to obtain a deviation. Deviation is representative of the number of pixels that have intensity values above and below the mean intensity and the standard deviation amount above and below the mean intensity. Thus, the third step involves transmitting a binary code corresponding to the mean intensity, pixel intensity values that are above or below that mean and standard deviation of each pixel value. These three indicia represent all the information needed for each partitioned block. Once the coded indicia are transmitted, the decoder functions merely to decode and reconstruct a decoded image from each set of indicia.

The essence of the BTC technique is the ease by which all three indicia can be represented in either a first or second moment. Each moment, commonly referred to as A or B moments, combine the essence of all three indicia by simple mathematical calculation. For a detailed explanation of calculations of first and second moments in BTC coding see D. J. Healy and Robert Mitchell, "Digital Video Band Width Compression Using Block Truncation Coding," I.E.E.E. Trans. Commun., Vol. Com-29, No. 12, pp. 1809-1817, Dec. 1981. Although BTC methods provide simple and fast coding, BPP rates are fairly high. BPP rates are recorded, on the average, to be around 1.3. Because compression ratios are generally inversely proportional to BPP rates, BTC methods prove inadequate in applications requiring high compression ratios. Using 8 bit pixel intensity values, BTC generally can only achieve compression ratios that are less than 8:1.

The second coding technique that has gained popularity along with BTC, is VQ coding. VQ coding is a relatively new image coding method that has recently attracted much attention. Like BTC, VQ partitions an image into numerous image blocks. Each image block must be mapped into an average or mean image block representative of all the blocks contained within a block cluster. See, e.g., Y. Linde, A. Buzo and R. M. Gray, "An Algorithm for Vector Analyzer Design," I.E.E.E. Trans. Common., Vol. Com-28, pp. 84-95, Jan. 1983. The clustering algorithm collects a large number of blocks drawn throughout the same sample images. Thus, each coded block is compared with code vectors in a codebook predefined in memory media. Each block is coded by transmitting a code of the closest block to it in the codebook. Decoding is fast and is achieved by a simple look-up in the codebook of the image vector having the specific target code. Since the coder and decoder employ the same codebook, only the index of the code vectors need be transmitted.

The advantage of VQ coding is its inherent ability to achieve lower BPP rates, or conversely, higher compression ratios. By coding a relatively small set of codes rather than the details of each block, VQ coding can achieve compression ratios of approximately 10:1 to 15:1.

Although compression rates are high, a major problem encountered in VQ coding is the time required to perform the block search when coding. VQ must decide upon a centroid image block for each cluster and match blocks to be placed within that cluster to the centroid image block value. This process requires a great deal of time-consuming computation. Along with the complexity and time-consumption problem, VQ coding also presents problems such as redundancy in the code vectors and low-quality image reproduction if there are an insufficient number of code vectors. Many redundant image blocks must be mapped and compared to the centroid block thereby unnecessarily adding time to the vector search operation. Furthermore, if the centroid block of a given cluster has a substantially different intensity value than the centroid block of another cluster, the transmitted code vectors corresponding to the widespread intensity values will produce low quality, low resolution decoded images.

The problems encountered with BTC or VQ coding, such as low compression rates or time-consuming computation, are compounded when sequences of digital images are coded and decoded. Coding and decoding of digital moving pictures entails a greater degree of complexity in the coding scheme, thereby aggravating the problems mentioned above. Whenever conventional coding/decoding schemes, such as BTC or VQ are used to code and decode moving pictures or sequences of digital images, the time needed for each data manipulation step makes conventional coding/decoding schemes prohibitive. Redundant sequences of digital images coded via conventional means forces the coding/decoding incapable of real-time operation.

SUMMARY OF THE INVENTION

The present invention overcomes the shortcomings of conventional coding and decoding techniques, and more particularly overcomes the problems associated with BTC and VQ coding schemes used with digital still and moving pictures The present coding invention can operate on either still or moving pictures. If still pictures are encountered, the present intention uses Visual Pattern Image Coding (VPIC). Conversely, if moving pictures are to be encountered, the present invention uses Visual Pattern Image Sequence Coding (VPISC). VPISC comprises a method and apparatus for transmitting sequences of digital images according to visually significant responses of the human eye. An important element of both VPIC and VPISC coding/decoding schemes is their ability to adapt to a hierarchical coding structure (HVPIC or HVPISC). HVPIC can be applied to VPIC, while HVPISC can be applied to VPISC scheme, to achieve greater coding efficiency with even greater accuracy. Still further VPISC can be modified using adaptive VPISC (AVPISC) to vary the quality or depth of resolution hierarchy required to retain a sufficient amount of sequential digital image detail. Even still further, the present invention utilizes foveal VPISC, or FVPISC as another modification of the standard concept of VPISC, HVPISC and AVPISC by allowing a human user to select a spatial point or points of which higher quality coding/decoding is desired at those points.

The basic concept of VPISC allows higher compression ratios so that sequences of digital images can be transmitted at a much higher rate using a reduced transmission channel bandwidth. Furthermore, image sequence files can be stored in a smaller memory medium. By utilizing the basic concept of VPISC, image sequences can be decomposed into a hierarchy (pyramid) of image sequences having variable resolutions. This hierarchical structure of varying resolutions, called HVPISC, yields high accuracy of coding reproduction by first efficiently coding the lowest-resolution version of the total image sequence by using the basic coding VPISC operation. Next, this low-resolution coded version of the image sequences is then used to augment coding of the high-resolution data in a progressive manner. By repetitively coding each resolution data level, beginning at the lowest level and ending at the highest level, a framework of error image sequences are coded at each level above the lowest resolution level resulting in considerable reduction of coding operation at higher resolution levels. Also, by maximizing bit information content at the low resolution levels, significant improvement in coding efficiency and quality occurs. The present invention relates to a system for encoding any type of computer-readable or digitized series of image sequences, representing digitally acquired real-time image sequences or digitally recorded image sequence data. Either gray-level image sequences or color image sequences can be compressed and coded according to the present invention using significantly fewer number of computer bits. Thus, the primary applications of the present invention may be directed to the fields of digital image sequence transmission (where image sequences are transmitted from one site to another through a telecommunication network or other communication medium) and/or digital image sequence storage (where multiple image sequences are stored for archival or reference purposes). By attaining higher compression, the present invention can transmit and receive a higher ratio of bits-per-pixel, or BPP.

Broadly speaking, the present invention contemplates a method of processing a time sequence of digital images comprising the steps of partitioning a time sequence of digital images into a plurality of sub-image time sequences, and calculating mean intensity value and image gradient magnitude over both space and time for each sub-image time sequence. Each sub-image sequence can be conceptualized as a three-dimensional cube of which two dimensions represent space and one dimension represents time. Thus, "sequences" and "sub-image" sequences are understood to be time dependent images or time sequences/sub-image time sequences. After the digital images are partitioned and mean intensity values are calculated for each sub-image sequence, visually significant sub-image sequences can be coded according to their gradient magnitude and then transmitted over a transmission channel. Once received at a remote location, the coded sub-image sequences are then decoded using the mean intensity value, gradient magnitude and gradient orientation to produce a plurality of decoded sub-image sequences. From those decoded sub-image sequences, a sequence of digital images or moving pictures can be arranged in both space and time to substantially reproduce the original sequence of digital images.

The basic method of processing a sequence of digital images, called VPISC, requires partitioning the sequence of digital images into equally sized plurality of sub-image sequences or cubes. In order for each sub-image sequence cube to be visually perceptible to the human eye, the two dimensional space vectors of each sub-image sequence cube must contain less than 10 visual discontinuities. The cube size is determined based upon the resolution of visual continuities perceptible to the human visual sensory system. As defined herein, "visually significant sub-image sequences", are those sequences which contain an edge or discontinuity during either a portion of the sequence or for the entire sub-image sequence period.

In another aspect of the present invention, the coding step described above comprises coding uniform sub-image sequences, changing (i.e., from uniform-to-edge or vice versa) sub-image sequences and edge sub-image sequences according to different algorithms. If the sub-image sequence cube is uniform, having gradient magnitudes below a pre-determined minimum for the duration of the sequence, then only the respective mean intensity value is coded and transmitted. Conversely, if sub-image cube is an edge, having gradient magnitudes above a pre-determined minimum for the of the sequence, then respective mean intensity value, gradient magnitude and gradient orientation are coded and transmitted. However, if sub-image sequence is changing, whereby gradient magnitude is less than a predetermined minimum for a first time interval of the sequence and greater than a predetermined minimum for a second time interval of a sequence, then mean intensity value is coded and transmitted for the first time interval and mean intensity value, gradient magnitude and gradient orientation are coded and transmitted for the second time interval Thus, it is important to note that the spatial orientation of an edge within the two-dimensional side of the cube can change with respect to the one-dimensional time dimension of the cube. Whenever this occurs, the edge orientation within the sub-image sequence changes and coding indicia must change also. The time period of a visually significant sub-image sequence is therefore coded according to the gradient orientation and magnitude, wherein sub-image sequences not having visually significant images are coded only according to mean intensity value.

In another aspect of the present invention, the decoding step described above further comprises the steps of creating a uniform space-time sequence cube for each coded uniform sub-image sequence and each coded changing sub-image sequence portion having gradient magnitudes below a predetermined minimum. The decoded uniform time-sequence cube is created according to only the respective mean intensity value of each respective uniform cube. Conversely, a decoded non-uniform or visually significant space-time sequence cube is generated for each coded changing sub-image sequence portion having gradient magnitudes above a predetermined minimum and each coded edge sub-image sequence. The non-uniform space-time sequence cube is generated according to respective visual space-time image code stored in a visual pattern library within the coding software or hardware. After the uniform and non-uniform space-time sequence cubes are created, the non-uniform space-time sequence cube is multiplied by the gradient magnitude to produce a scaled space-time sequence cube. Adding uniform space-time sequence cube to the scaled space-time sequence produces the desired decoded sub-image sequences which substantially correspond to the sequence of digital images originally coded.

In another preferred aspect of the present invention, sequences of color images can be processed using the VPISC and HVPISC processes. In particular, a method of processing a sequence of colored images comprises the steps of separating a sequence of color images into a plurality of sequences of chromatic images and then partitioning each of the sequences of chromatic images into a plurality of sub-image sequences. The chromatic images are then processed by calculating a mean intensity value and image gradient magnitude over both space and time for each sub-image sequence. The sub-image sequence is either uniform, changing or edge. If the sub-image sequence is a uniform sub-image sequence, then coding occurs according to only the respective mean intensity value. However, coding of the changing sub-image sequence can occur according to either (i) mean intensity value, or (ii) mean intensity value, gradient magnitude and gradient orientation Still further, if edge sub-image sequences are encountered, those sequences are coded according to respective mean intensity value, gradient magnitude and gradient orientation. Once coding is completed, for one of the plurality of chromatic image sequences, all others of the plurality of sequences can be coded to represent coding of the entire color image sequence. Thus, each chromatic image is transmitted and received and subsequently decoded at a remote location using mean intensity value and gradient orientation. Once decoding is accomplished, the decoded chromatic sub-image sequences is used as a benchmark for the other chromatic colors and are combined together to produce a decoded sequence of color images.

In another preferred embodiment of the present invention, a sequence of digital images can be coded according to a hierarchical scheme. This hierarchical scheme, or HVPISC, comprises the steps of partitioning a sequence of digital images into a plurality of resolution levels, each level having a plurality of sub-image sequences. Next, mean intensity value and image gradient magnitude is computed over both space and time for a lowest resolution level of the plurality of resolution levels. Coding first level sub-image sequences at the lowest resolution level is then achieved according to the first level sub-image sequence respective gradient magnitudes. The coded first level sub-image sequence is then expanded to sub-image sequences at the next to lowest resolution level and residual sub-image sequences are then calculated. The steps of converting and calculating are repeated to derive expanded sub-image sequences and residual sub-image sequences for each resolution level up to and including the desired highest resolution level. Only the residual sub-image sequences are coded and, only the coded residual sub-image sequences and expanded sub-image sequences are transmitted to a remote receiver.

In another aspect of the HVPISC method, the coded residual sub-image sequences and expanded sub-image sequences are transmitted and received at each resolution level and then the coded residual sub-image sequences are decoded at the receiver location. By adding the decoded residual sub-image sequences and the expanded sub-image sequences at each respective resolution level, a plurality of decoded sub-image sequences are created at the remote decoder location. The decoded sub-image sequences are then arranged in both space and time to substantially reproduce the original sequence of digital images or moving pictures.

In another aspect of the present invention, AVPISC targets the highest resolution level as that level where residual sub-image sequences substantially correspond with respective actual sub-image sequences at each desired resolution level. Accordingly, AVPISC determines the depth in the resolution hierarchy required to retain a sufficient amount of detail by measuring the error computed between coded image sequences at successive resolution levels. The depth of resolution hierarchy need not extend to the highest resolution level but can stop at the "desired" resolution level. Thus, AVPISC can eliminate higher level resolution coding/decoding if the "desired" resolution level is intermediate the lowest and highest level. Once this desired level is reached, then an octree is constructed and transmitted/received over a communication channel. The octree represents efficient hierarchical coding of visually significant space-time sub-images. Non-significant sub-images are not transmitted thereby causing a break in the octree chain.

In another aspect of the present invention, FVPISC utilizes coding through the full hierarchy of resolutions but only at the point where the human user has selected to be of interest. All other points may only require lowest hierarchical level coding/decoding. FVPISC allows user interaction into the octree construction. A user-defined octree can be directly input into the communication channel. A specific localized space-time region can be targeted by the user as the region for highest resolution level analysis. Any other region may only be coded at the lowest level.

It is important to note that the above methods can be utilized in either hardware or software and can be equally applicable to either black-white or color-moving sequential pictures. Redundancy which normally exists in conventional coding schemes is virtually eliminated in the present method. All uniform sub-image sequence cubes or sub-image sequence cubes having partially uniform spatial indicia can be easily coded/decoded with a single mean intensity value. Thus, identical uniform sub-image sequences can be quickly and easily coded and decoded with maximum compression value and BPP. Furthermore, the present method utilizes visually significant sizings of the sub-image sequence code according to visually significant or perceivable edges detectable by the human eye.

BRIEF DESCRIPTION OF THE DRAWINGS

FIGS. 5a-5d show various orientations of the simple visual patterns used in coding an image block according to a preferred embodiment of the present invention.

FIG. 6 is a table showing required total bits, total BPP and compression ratios for various block types and algorithms of a preferred embodiment of the present invention.

DESCRIPTION OF THE PREFERRED EMBODIMENTS

The present invention utilizes a method and apparatus for visual pattern image coding, transmitting, receiving and decoding, or for visual pattern image sequence coding, transmitting, receiving and decoding. A preferred embodiment of the present invention, i.e., visual pattern image coding (VPIC), utilizes coding and decoding schemes useable on stationary or static images. Conversely, an alternative preferred embodiment, i.e., visual pattern image sequence coding (VPISC), and improvements thereon such as hierarchical VPISC (HVPISC), adaptive VPISC (AVPISC), foveal VPISC (FVPISC), all relate to dynamic digital image sequences useable on moving patterns. Depending upon the application, either VPIC or VPISC (and modifications of VPISC) can be used to provide a high compression, high quality, high BPP rate, but at substantially reduced computational time.

VPIC

Figure 1:
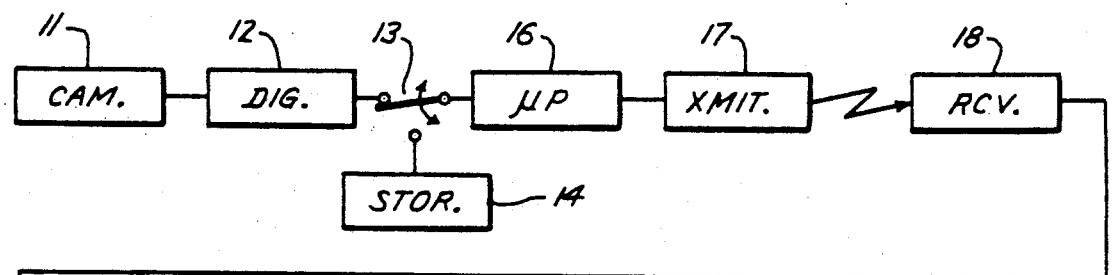
FIG. 1 is an apparatus for coding and decoding still and moving visual patterns according to the present invention.

FIG. 1 is a block diagram of an apparatus for visual pattern image coding (VPIC), transmitting, receiving and decoding, according to the preferred VPIC embodiment of the present invention.

Original images are obtained by, for example, television camera which can be a Panasonic type WVCD50 camera which provides an analog video signal to video digitizer 12. Digitizer 12 can be any commercially available hardware or software controlled digitizer, for example, a commercially available "frame-grab" board that can be installed in microcomputers or work stations, such as a PCVISION brand board available from Imaging Technology. Digitizer 12 produces an array of pixels, with the intensity of each pixel being represented by a binary number. For example, the PCVISION digitizer produces a 512×512 pixel array with each pixel represented by an 8-bit grey scale number, resulting in 256 grey scale levels per pixel.

Alternatively, and as illustrated schematically by switch 13, digitized images can be provided directly from storage medium 14 which can be, for example, semiconductor memory, magnetic memory such a floppy disk, or optical memory such as a compact disk.

Figure 2:
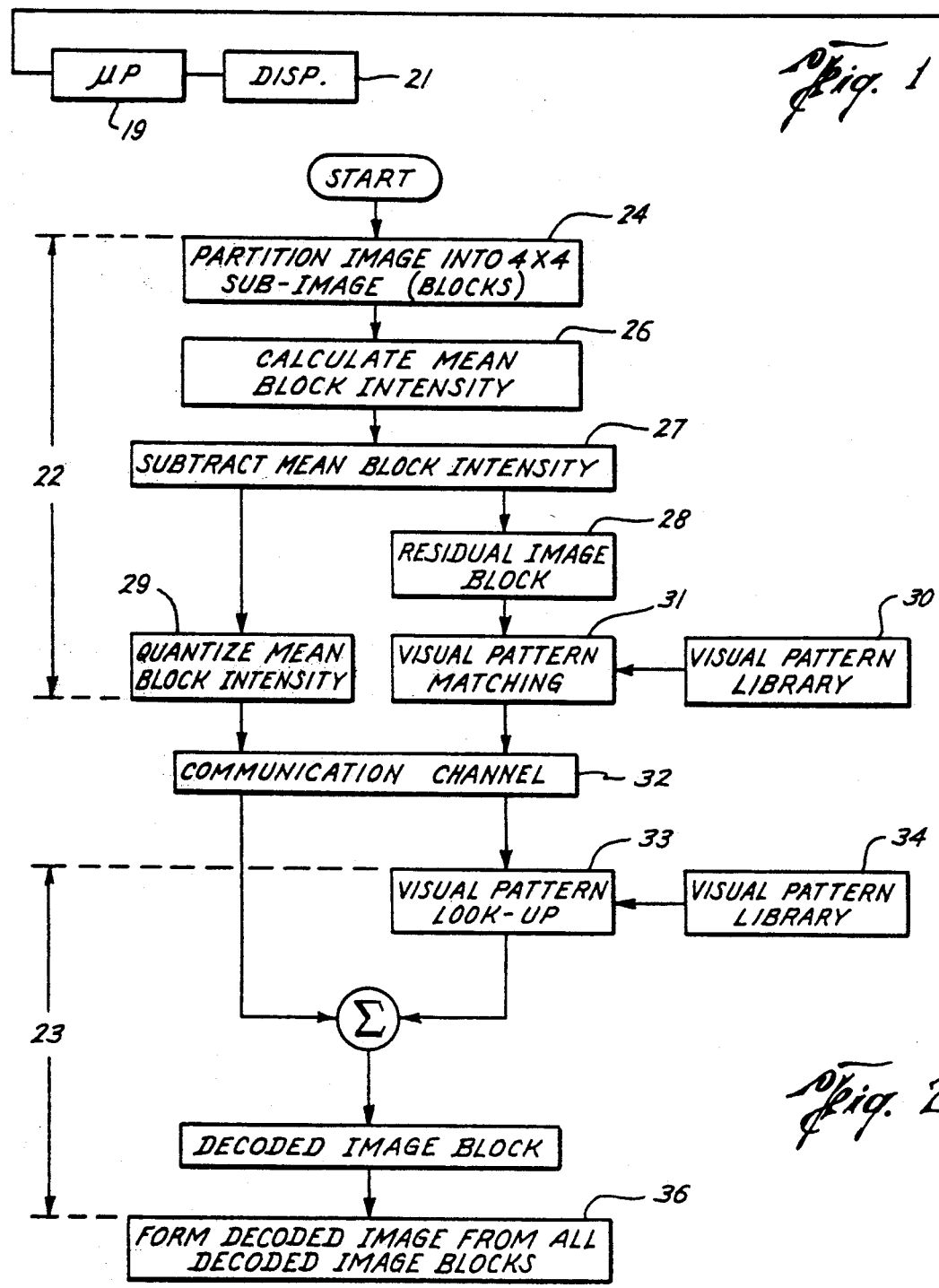
FIG. 2 is a flow diagram of the coding and decoding operations of a preferred embodiment of the present invention using VPIC methodology.

Digitized images from digitizer 13 or storage medium 14 are applied to microprocessor 16 wherein the digitized image is encoded in accordance with the steps shown schematically in FIG. 2, and in detail in the source code program included at the end of this specification.

Microprocessor 16 can be any commercially available microcomputer or work station, such as a IBM RTPC Engineering Work Station, a Sun work station, a Digital Equipment VAX work station, an Apple MacIntosh Mac II, or compatible microcomputers or work stations. In addition, microprocessor 16 can be a dedicated programmable signal processing chip, such as a TMS type signal processing integrated circuit available from Texas Instruments.

The coded video image is applied to transmitter 17 for transmission to receiver 18. Transmitter 17 and receiver 18 can be any type of well known telecommunications network, such as, for example, radio frequency, microwave, telephone, optical, as well as equivalent types of communications networks. At the receiving end of the present invention, the encoded video image is decoded by microprocessor 19 which can be any of the above-mentioned types of microprocessors, programmed according to the flow chart shown in FIG. 2, and in detail in the source code program listing included at the end of this specification.

The decoded video images then displayed on CRT display 21, and/or printed, stored, or otherwise used.

FIG. 2 illustrates a flow diagram of various steps required to code and decode a visual image according to the present invention. The original image can be either monochromatic or color and can be either analog or digital. The method of the present invention includes coding steps 22 and decoding steps 23. Each digitized incoming image is applied to block 24 where the digital image is partitioned into a plurality of sub-images or image blocks. Each image block is of predetermined size determined by the assumed viewing angle of the human eye. The viewing angle is discussed later and is shown in FIG. 2. In the preferred embodiment, the image block is 4×4 pixel locations in size for the assumed viewing angle. Thus, each image block in the preferred embodiment has 16 pixels arranged in an array within the block's boundary. However, it is important to note that the size of the image block can vary depending upon the type of images to be coded. If the images are of low resolution type, then 5×5, or 6×6, etc. pixel arrays may be preferred for the image block. In addition, blocks other than square image blocks can be used. Any block size or shape is feasible provided the size and shape are optimally fixed as determined by the viewing geometry of the human eye. For simplicity, and for the purposes of illustration, the following discussion will be directed to image blocks fixed in 4×4 pixel array.

After image blocks are obtained, a mean block intensity calculation step 26 is be performed on each image block. Mean block intensity is computed by binary adding the digital number for each pixel contained in an image block, and by dividing the sum by the total number of pixels in the block. In the present example, the total number of pixels is fixed at 16. As shown in FIG. 2, mean block intensity is used for two purposes, 1) to derive a residual image block in step 28 and, 2) to be quantized and coded for transmission purposes in step 29. The residual image block is produced in step 27 by subtracting mean block intensity from each pixel digital value in the image block. After mean intensity is subtracted, residual pixels are produced having digital values distributed about zero. Those residual pixels having intensity values greater than zero are represented with positive polarity, and those pixels having intensity values less than zero are represented by negative polarity. As explained below in more detail with reference to FIG. 5, the positive and negative polarity patterns define various configurations corresponding to the location and orientation of visual discontinuities within each image block. The number of different patterns is fairly small, for example, four or eight in number. The entire set of visual patterns are stored in library 30 of computer memory and are used to match against each residual image block in matching step 31. Visual pattern matching can be performed rapidly since the number of predetermined visual patterns stored in library 30 is fairly small.

Before determining whether a pattern stored in memory 30 matches the residual image block under analysis, matching step 31 performs image gradient calculations on the residual image block to determine whether the residual image block contains any visually significant discontinuities, or edges. If matching block 31 determines that the residual image block under analysis contains no visually significant discontinuities, the residual image block is concluded to be a uniform image block, and only mean block intensity is transmitted for that block. If, on the other hand, matching step 31 determines that the residual image block contains a visually significant discontinuity, the image gradient of the residual image block is used to select the proper pattern from visual pattern library 30. Then, a code corresponding to the matching visual pattern is transmitted along with the mean block intensity.

In addition, matching block 31 can calculate a gradient magnitude for the residual image block, which is an indication of the difference in intensity on either side of the visually significant discontinuity contained within the residual image block. If desired, gradient magnitude can also be transmitted with mean block intensity and visual pattern code.

Once the coded images are received at their final destination, they are decoded by decoding steps 23. As shown in FIG. 2, decoding steps 23 comprise visual pattern look-up step 33 which locates the visual pattern from the visual pattern library 34 using the received visual pattern code. Gradient magnitude, if transmitted, and the selected visual pattern are multiplied to produce a scaled visual pattern. The scaled pattern is then added to a uniform image block which consists of pixel values equal to received quantized mean block intensity. The sum of the scaled pattern and uniform image block represents the decoded version of the original image block. Each decoded image block is then assembled in proper sequence in block 36 to yield a decoded image that closely visually approximates the incoming image.

An important aspect of the present invention is the ability to distinguish between visually significant and visually insignificant image blocks. The human eye, being an efficient image processing tool, can be analyzed as a processing center that processes images into sub-images or blocks having visually significant indicia. Human eyes have photoreceptive cells in the retina which convert incoming light into electrical signals that are relayed and processed by the post-retinal ganglion cells and later, in the visual cortex. Ganglion and cortical cells have receptive fields that respond to the spatial structure of incoming stimuli. Certain receptive fields are not sensitive to the absolute light intensity but they are quite sensitive to the difference of the light intensity following any excitatory and inhibitory regions. These receptive fields have different shapes and are sensitive to stimuli of specific shapes and sizes. Accordingly, cortical cells have simple cells which appear to be sensitive to bar or edge-like structures. See, L. Kaufman, *Perception*, Oxford University Press, pp 135-146 1979.

The composition of images into low frequency blocks or blocks containing a single visual pattern (edge) suggest that an image can be adequately represented by localized block description of smooth (continuous) regions and disjunctive (edge) regions. Recent work in this area has led researchers to conclude that retinal cells of human eyes are sensitive to a spatial frequency range shown in FIG. 3a. See, e.g., L. Kaufman, *Perception*, Oxford University Press, pp 135-146 1979; N. D. Levine, *Vision in Man and Machine*, McGraw-Hill, chapters 2 and 6, 1985. As demonstrated in FIG. 3a, normal eyes are sensitive to the spatial frequency in the range of 1-10 cycles/degree. Thus, the human observer can optimally detect between 1 to 10 edges or cycles per viewing degree. In addition, as the spatial frequency or number of edges per degrees increases, the digital response time of the human observer increased accordingly. As shown in FIG. 3b, if there are numerous visual discontinuities visible in a given viewing angle, response time can be fairly slow. For example, if the viewing angle is one degree and there are five discontinuities or cycles shown in that viewing angle, then response time is approximately 250 milliseconds.

Figure 3A:
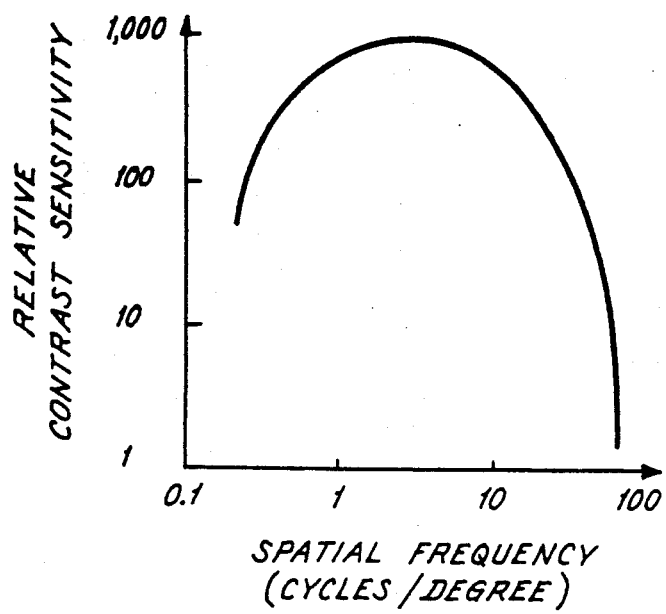
FIG. 3a is a graph showing spatial frequencies versus sensitivity of a human eye.
Figure 3B:
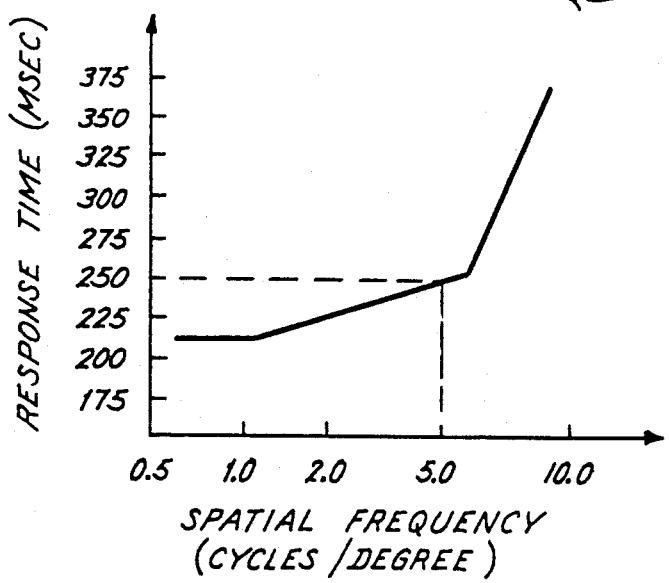
FIG. 3b is a graph showing spatial frequencies versus response time of a human eye.

The spatial frequency response curve and latency response curve of FIGS. 3a and 3b respectively, combine to form the spatial frequency constraint that is exploited by this invention. Image blocks are sized in accordance with the spatial frequency constraint. Due to the limitations of visual frequency response, a coding algorithm need only code image structures within a certain spatial frequency range. Anything outside that range can be omitted without causing visual distortion. In other words, only visually perceivable or significant edge and contrast information need be coded. Since the overall passband on the receptive field of the normal human eye is in a range of 1-10 cycles/degree, image frequencies exceeding 10 cycles/degree contribute very little to perception due to the lower frequency response and greater increased latency. The present invention functions to constrain the pattern size for the image block based upon this overall passband characteristic of the receptive fields in conjunction with a reasonable viewing geometry. The present invention uses a coding scheme whereby an image is broken into either uniform blocks or edge blocks. Uniform blocks are of low spatial frequency or high spatial frequency and are visually continuous while edge blocks are visually discontinuous. Uniform blocks can be represented by quantized mean block intensity. Conversely, edge blocks require visual pattern code, gradient magnitude, and quantized mean block intensity for full representation of the edge location, orientation and intensity contrast on opposite sides of the discontinuity.

Figure 4:
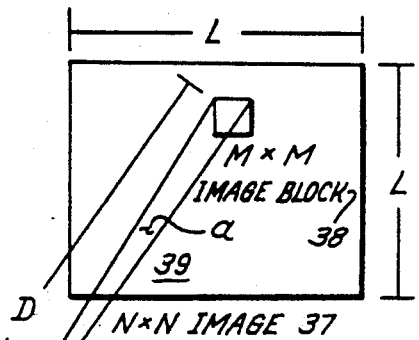
FIG. 4 is a diagram showing visually significant image block derived from optimal viewing angle of a human eye.

The strategy adopted in the present invention is that the size of the image block is chosen to contain at most one visible discontinuity. This constraint can be supported by reference to FIG. 4. Assume that image 37 to be coded is of N×N pixel geometry and that image block dimensions are M×M pixels. If monitor 39 is used to display N×N pixels, and the size of monitor 39 is L×L cm, and D is the viewing distance between viewer 41 and monitor in cm, then if D is much larger than L, the viewing angle alpha ($\alpha$) subtending an image block is approximately:

$$\alpha \approx 180 \tan^{-1}(\tfrac{L M}{N D}).$$

For typical values where N=512, M=4, L=21.5 cm and D=200 cm, the viewing angle $\alpha$ is approximately 0.15. Referring back to FIG. 3a, if the visual passband is maximized between 3-6 cycles/degree, then approximately 1 cycle or edge can occur within the 0.15 degree view angle. Under a standard viewing distance of 200 cm., 0.15. viewing angle generally corresponds to a 4×4 image block array. Thus the image block may be advantageously fixed at a 4×4 pixel size. Although this example results in 4×4 pixel blocks, other block sizes are feasible provided they satisfy the necessary conditions imposed by the viewing geometry. Preferably, 4×4 pixel image blocks are used, which serve to demonstrate the power of the decoding algorithm, and which also simplifies pattern design. It should be observed, however, that the range of frequencies processed biologically is divided into several different channels: this suggests that multi-scale modifications of VPIC can be designed that define a set of spatial frequency constraints derived from the various passbands, and that operate over a hierarchy of resolutions. At each scale of processing, the size of the image blocks or visual patterns used can be varied without changing the number of patterns, by varying the resolution of coded blocks.

Since the predetermined visual patterns are used to represent natural images as perceived by a human observer, the selected visual patterns must be visually significant and give a quality representation to the original image while satisfying the visual constraints described above. This is accomplished, according to the present invention, by using small patterns or image blocks of such a size that edges contained in one or more of these blocks activate cortical neurons. Also, image blocks should not be repetitive.

As mentioned earlier, uniform blocks are coded using a single indicia (i.e., mean block intensity) so as to reduce the amount of coding needed for substantially redundant patterns associated with uniform image blocks. It is the edge image block that receives additional coding operations since accurate discontinuity location is crucial for achieving high definition image processing.

In choosing the predetermined visual patterns stored in visual pattern libraries 30 and 34 (FIG. 2), the image to be coded is first denoted as an array $I = I_{i,j}$ that is a union of disjoint 4×4 image blocks, each of the form:

$$b_{i,j} = [I_{n,m}: 4i \leq n \leq 4i+3, 4j \leq m \leq 4j+3].$$

Prior to assigning patterns to image blocks (step 31, FIG. 2), the mean intensities of the image blocks are coded separately (blocks 26 and 29, FIG. 2), and the mean intensity is subtracted from the individual pixel values of the image block (step 27, FIG. 2), to produce a residual image block (step 28, FIG. 2), having mean zero mean intensity. This allows for the design of predetermined visual patterns independent of the average intensity differences that occur between image blocks, hence reducing the number of required predetermined patterns.

In determining visual patterns which accurately represent visually discontinuous image blocks, a measure of the intensity variation, and specifically the edge or discontinuity content of the image I, is the discrete gradient $\nabla I = (\Delta_x I, \Delta_y I)$, where the directional derivative approximations $\Delta_x I = \Delta_x b_{i,j}$ and $\Delta_y I = \Delta_y b_{i,j}$ are computed as oriented differences between weighted averages of contiguous average neighborhoods lying within each image block. Computationally convenient definitions of the directional variations within each image block are:

$$\Delta_x b_{i,j} = \text{AVE}[I_{n,m}: 4i+2 \leq n \leq 4i+3, 4j \leq m \leq 4j+3] - \text{AVE}[I_{n,m}: 4i \leq n \leq 4i+1, 4j \leq m \leq 4j+3]$$

$$\Delta_y b_{i,j} = \text{AVE}[I_{n,m}: 4i \leq n \leq 4i+3, 4j+2 \leq m \leq 4j+3] - \text{AVE}[I_{n,m}: 4i \leq n \leq 4i+3, 4j \leq m < 4j+1].$$

The gradient magnitude (a measure of the intensity change from one side of the edge to the other), and the gradient orientation (a measure of the angle of the edge within the image block) within each image block are given respectively by:

$$|\nabla b|_{i,j} = \sqrt{(\Delta_x b_{i,j})^2 + (\Delta_y b_{i,j})^2}$$

and;

$$\angle \nabla b_{i,j} = \tan^{-1}\left[\frac{\Delta_y b_{i,j}}{\Delta_x b_{i,j}}\right]$$

The computed gradient magnitude and gradient orientation correspond to the contrast and orientation of the intensity change occurring within the image block $b_{i,j}$. These quantities have continuous ranges that, according to the present invention, are quantized to simplify coding for transmission. Since small image blocks are used, gradient orientation is quantized in 45° increments, yielding four basic edge patterns with respective orientations of 90°, 45°, 0° and −45°. The remaining orientations, 135°, 180°, 225°, and 270°, have the same orientation as the four basic edge patterns, but have opposite contrast. These are coded, according to the present invention, by separately coding and transmitting a polarity bit along with the pattern code.

It should be noted that the arctangent function (a computationally inefficient function) is not actually used to calculate gradient orientation. Rather, since the gradient orientations are quantized, constants can be stored for simple comparison with the directional variations.

FIGS. 5a-5d illustrate possible combinations of visual patterns used for detecting a single discontinuity within each image block. There are 14 visual patterns that depict a set of possible edge locations and orientations within a 4×4 pixel array or image block. The break between positive and negative polarity represent the location and orientation of the edge. In a boundary or edge between a lighter and darker disjunctive region, positive and negative polarity represent that disjunctive region. The visual patterns shown in FIGS. 5a-5d may be represented by four basic edge patterns with respective orientation of 90°, 45°, 0° and −45°. However, any number of patterns may be used without departing from the scope of the invention. Choosing a set of patterns (for example, 4 patterns or all 14 patterns) allows the predetermined image blocks to be centered at a variety of distances from the edge at any orientation. Using only $P_2$, $P_6$, $P_9$ and $P_{12}$ allows for a smaller BPP ratio and conversely, greater compression ratio than when all visual patterns $P_1$-$P_{14}$ are used with little degradation in image quality. As demonstrated below, a surprisingly small number of patterns selected from FIG. 5 can code images with remarkable quality.

In one embodiment of the invention, transmitted along with coded representations of the matched visual pattern is gradient magnitude. Gradient magnitude is a quantized value assigned to each pixel location in accordance with binary coded representation of that quantized value. If the intensity difference between difference is rather substantial, i.e., the difference between white and black, then the gradient magnitude will be quite large. However, if the difference is small, such as that found between different shades of gray, blue, red or green, then gradient magnitude is fairly small. Along with magnitude, gradient polarity is also transmitted digitally to indicate which side of the edge has the higher gradient intensity value. As will be shown later, the gradient intensity range can be limited without severely limiting intensity contrast of the decoded image. In addition, gradient magnitude need not be transmitted at all, and the decoder can use a predetermined gradient magnitude without significant degradation of image quality.

It has been observed that image blocks having a zero or very low gradient magnitude are usual, and the frequency of gradient magnitude decreases quickly beyond some high value. In the present invention, two thresholds are set that constrain the range of image gradient magnitudes to be coded. The low threshold, $|\nabla I|_{min}$, represents the minimum perceivable gradient magnitude that can occur in an image. As mentioned above, if the calculated gradient magnitude for a particular residual image block is less than the low threshold, the image is concluded to be a uniform block, and only mean intensity for that block is transmitted, and edge orientation need not be computed. Thus, $|\nabla I|_{min}$, effectively determines the number of edge blocks present in the image, the remaining image blocks being coded as uniform patterns. Although there is considerable flexibility in the choice of the minimum gradient threshold, it is not a function of the image to be coded. Moreover, the speed of the coding algorithm is independent of the minimum threshold.

A second threshold, $|\nabla I|_{max}$, denotes the maximum gradient magnitude that is coded distinctly, with all gradient values above this being truncated to the value, $|\nabla I|_{max}$. In selecting the second threshold, it is to be noted that large gradient values occur infrequently and that the human eye is not very sensitive to the magnitude of edge gradients. Of much greater visual significance is the simple presence of edges, and the average image intensities near the edges. The difference between the high and low thresholds for gradient magnitude determine the range of gradient magnitudes that are actually coded.

It should be emphasized that gradient magnitude need not be coded and transmitted, and that a predetermined gradient magnitude can be presumed by the decoding portion of the invention without significant degradation of image quality.

Referring to the Table in FIG. 6, total bits required to code uniform block and edge block using the two embodiments of the present invention (denoted algorithm I and algorithm II) are shown. Four basic patterns $P_2$, $P_6$, $P_9$ and $P_{12}$ (FIG. 5) are used in algorithm I, while 8 basic patterns $P_1$, $P_3$, $_5$, $P_6$, $P_8$, $P_{10}$, $P_{12}$ and $P_{13}$ (FIG. 5) are used algorithm II. In algorithm I, gradient magnitude minimum and maximum are not transmitted and are set at 30 (out of 256), whereas in algorithm II, gradient magnitude minimum and maximum are 10 and 90 (out of 256). Thus, the number of gradient magnitudes (M) for algorithm I is 1, and for algorithm II is 8 (the gradient range being quantized in equal increments of 10). Having a lower threshold gradient magnitude of 10, shown in algorithm II rather than 30 in algorithm I, means that minor differences in edge details can be coded in algorithm II in areas where contrast changes are significant. Conversely, larger gradient magnitude maximums will smooth very fine edge details. Since M in algorithm I is 1, the bit value representation, or gradient index, is not required in algorithm I. However, the bit value representation for M=8 in algorithm II is 3 since 3 bits are required represent numbers 1-8. Thus, an additional 3 bits are required for the gradient index of algorithm II.

Also shown in FIG. 6 is block type indicator bit which is a single bit to indicate whether or not the block is a uniform block or an edge block. Mean intensity represents the number of bits required to characterize mean block intensity. If the block is uniform, higher resolution of mean intensity can be achieved by assigning more bits to uniform blocks than to edge blocks, if desired. The number of bits shown in FIG. 6 which represent mean intensity are found to produce adequate coverage of all possible mean intensity values. However, these numbers, as with all of the bit numbers provided in FIG. 6, are merely illustrative, and should not be considered to limit the invention. The number of bits assigned to each indicia can be changed substantially depending upon the application and desired outcome. Also shown in FIG. 6, is a pattern index representing the number of bits needed to characterize the various orientations of the predetermined visual patterns. Since algorithm I uses only four basic patterns, $P_2$, $P_6$, $P_9$ and $P_{12}$, only two bits are needed to represent all four combinations. However, three bits are needed to represent the 8 basic patterns ($P_1$, $P_3$, $P_5$, $P_6$, $P_8$, $P_{10}$, $P_{12}$ and $P_{13}$) of algorithm II. The end result or total for all of the bits needed to convey adequate representation of each image block is shown in FIG. 6, and is dependent upon the application (i.e., whether or not algorithm I or algorithm II is chosen and whether or not the block type is uniform or edge). Note that in all cases, compression ratios exceed 10—best-case estimate for VQ coding and vention avoids redundancy inherent in BTC and VQ schemes.

At very high compression ratios, the predominant distortion that occurs in the present invention are block effects arising from coarse quantization of the average intensities in uniform (non-edge) blocks. Block effects are manifested as visual false contours occurring between blocks of similar average gray level. To correct this problem, simple block smoothing algorithms may be applied to the mean block intensity, without degrading the image details (edges). An efficient smoothing technique is to apply a smoothing filter to the mean intensity before the edges are superimposed. It is found that a simple 3×1 moving average filter applied along each dimension of the mean intensity sub-image prior to adding the edge block, decreases the visual distortion. The moving average filter is simply the weighted average of three adjacent points. TABLE I shows the computation complexity of a 4×4 decoding and smoothing operation when both equal weight and nonequal weights are used:

TABLE I

|  | Equal Weights | Non-Equal Weights |
|---|---|---|
| Pattern Addition | 16 add. | 16 add. |
| Post-filtering | 96 add, 32 mul. | 320 add. |
| Operation/Pixel | 7 add., 2 mul. | 21 add. |

Figure 8A:
FIGS. 7a-c, 8a-c and 9a-c show comparisons between original images and those original images coded and then decoded using algorithm I and algorithm II of a preferred embodiment of the present invention.
Figure 8B:
Figure 8C:
Figure 7A:
Figure 7B:
Figure 7C:
Figure 9A:
Figure 9B:
Figure 9C:

Simulation results of the present invention are shown in FIGS. 7, 8 and 9. Algorithms I and II described in coding and equal weights described in decoding are used on "Lena", "Mandrill" and "Pepper" images to provide examples of the present invention in operation. FIG. 7a is the original Lena image, FIG. 7b is the coded Lena using algorithm I of the present invention, and FIG. 7c is the coded Lena image using algorithm II of the present invention. Shown in FIG. 8a is the original Mandrill image, FIG. 8b is the coded Mandrill using algorithm I, and FIG. 8c is the coded Mandrill using algorithm II. Finally, FIG. 9a is the original Pepper image, FIG. 9b is the coded Pepper using algorithm I, and FIG. 9c is the coded Pepper image using algorithm II. The following TABLE II illustrates the simulation results for all three images:

TABLE II

|  | Image | | | | | |
|---|---|---|---|---|---|---|
|  | Lena | | Mandrill | | Pepper | |
|  | Algorithm | | | | | |
|  | I | II | I | II | I | II |
| Uniform Blocks | 14890 | 12413 | 12496 | 69311 | 50361 | 3061 |
| Edge Blocks | 1494 | 3971 | 3888 | 9453 | 1321 | 3323 |
| BPP | 0.38 | 0.49 | 0.39 | 0.56 | 0.38 | 0.48 |
| Compression | 21.06 | 16.44 | 20.61 | 13.89 | 21.09 | 16.74 | much better than BTC methods. In addition, the present invention is two orders of magnitude faster than VQ coding.

Image decoding is very simple using the present invention. The coded image blocks are represented either as uniform blocks or as edge blocks, the decoding of the present invention can be easily achieved through one of two simple methods. Edge block decoding only requires simple table look-ups, a single multiplication, and a single addition. Thus, image decoding is no more complex than VQ. Moreover, uniform blocks can be more easily decoded than either VQ or BTC since decoding of uniform blocks according to the present in-

TABLE I

|  | Equal Weights | Non-Equal Weights |
|---|---|---|
| Pattern Addition | 16 add. | 16 add. |
| Post-filtering | 96 add, 32 mul. | 320 add. |
| Operation/Pixel | 7 add., 2 mul. | 21 add. |

An alternative preferred embodiment of the present invention involves digital coding of color images. Perception in color by the three elementary colors, red, green and blue, is commonly known as trichromacy. Any color can be matched by a proper linear combination of these three colors. The luminance of the color mixture is equal to the sum of luminance of three individuals, red, green and blue (RGB) colors. Consequently, a straightforward way of color representation is the RGB representation that is most dominant in modern color sensing devices. In the RGB representation, a color image is composed of three different single color images: red, green and blue components. The equally weighted sum of the RGB images yield the full color image. Moreover, in color television broadcasting, YIQ color representation can be made according to NTSC standards, wherein YIQ relates to RGB linearly by:

$$Y = 0.299 R + 0.587 G + 0.114 B$$

$$I = 0.596 R - 0.274 G - 0.322 B$$

$$Q = 0.211 R - 0.523 G + 0.312 B$$

The Y signal is called the luminance signal that appears white or no color. The I and Q signals are called the hue and saturation signals.

It has been shown experimentally that chromatic information in the different color components using either the RGB or YIQ representation is highly spatially correlated. Thus, a single visual pattern can be used to code a block taken at the same resolution and from the same point in the image for each of the three color components. In addition, pattern gradient magnitudes can still be coarsely quantized, and used to represent the pattern gradient of all three color components.

In RGB images, the green image component is used for the extraction of pattern information, since the human eye is most sensitive to this component. The present invention is applied to the green color separated image to obtain the mean intensities and edge pattern of each green image block. The red and blue color separated components are simply assessed for mean intensity, but no pattern information is extracted or coded from these. Decoding proceeds simply as well. The green image is decoded as described above for the monochromatic image, and the red and blue images are decoded using the transmitted red and blue mean intensities, and the edge patterns obtained from the green image. Thus, considerable savings in the BPP rate and in the coding complexity are achieved.

Similarly, in YIQ images, the luminance is used to obtain mean luminance intensities and edge patterns for each luminance image block, and the hue and saturation signals are assessed only to determine the mean image block intensities. The luminance image is decoded using the transmitted mean intensity and pattern information for the luminance blocks, and the hue and saturation images are decoded using the transmitted hue and saturation mean intensities, and the edge patterns obtained from the luminance image.

The foregoing description of the invention has been directed to a particular preferred and alternative embodiments of the present invention. It will be apparent, however, to those skilled in the art that modifications and changes in method may be made without departing from the scope and spirit of the invention. For example, instead of using 4×4 pixel arrays, any size of pixel arrays may be used providing the size of the array is of satisfactory viewing geometry as dictated by the physiological visual response curve described earlier. Also, the size of visual pattern library can be varied depending upon the number of visual patterns necessary for the given application. It is preferred, however, that four is the minimum number of visual pattern. Still further, it is important to note that either monochromatic or color images can be coded and decoded without deviating from the invention. Therefore, it is the applicants' intention in the following claims to cover all equivalent modifications and variations, including those described herein, which fall within the true spirit and scope of the invention.

VPISC, HVPISC, AVPISC and FVPISC

Turning now to FIGS. 10-18, the present invention is shown implemented in several different forms, which are termed Visual Pattern Image Sequence Coding (VPISC); Hierarchical Visual Pattern Image Sequence Coding (HVPISC); Adaptive Visual Pattern Image Sequence Coding (AVPISC) and Foveal Visual Pattern Image Sequence Coding (FVPISC). VPISC is the basic image sequence coding method that forms the basis for the other modifications: HVPISC, AVPISC and FVPISC. HVPISC modifies VPISC by introducing a hierarchical coding strategy leading to significant gains in compression/visual quality relative to VPISC at small additional computational expense. AVPISC and FVPISC are modifications of HVPISC wherein the hierarchy depth of the coding process is determined by either a measure of local space-time image sequence detail or by foveation or local interestingness criteria.

Figure 10:
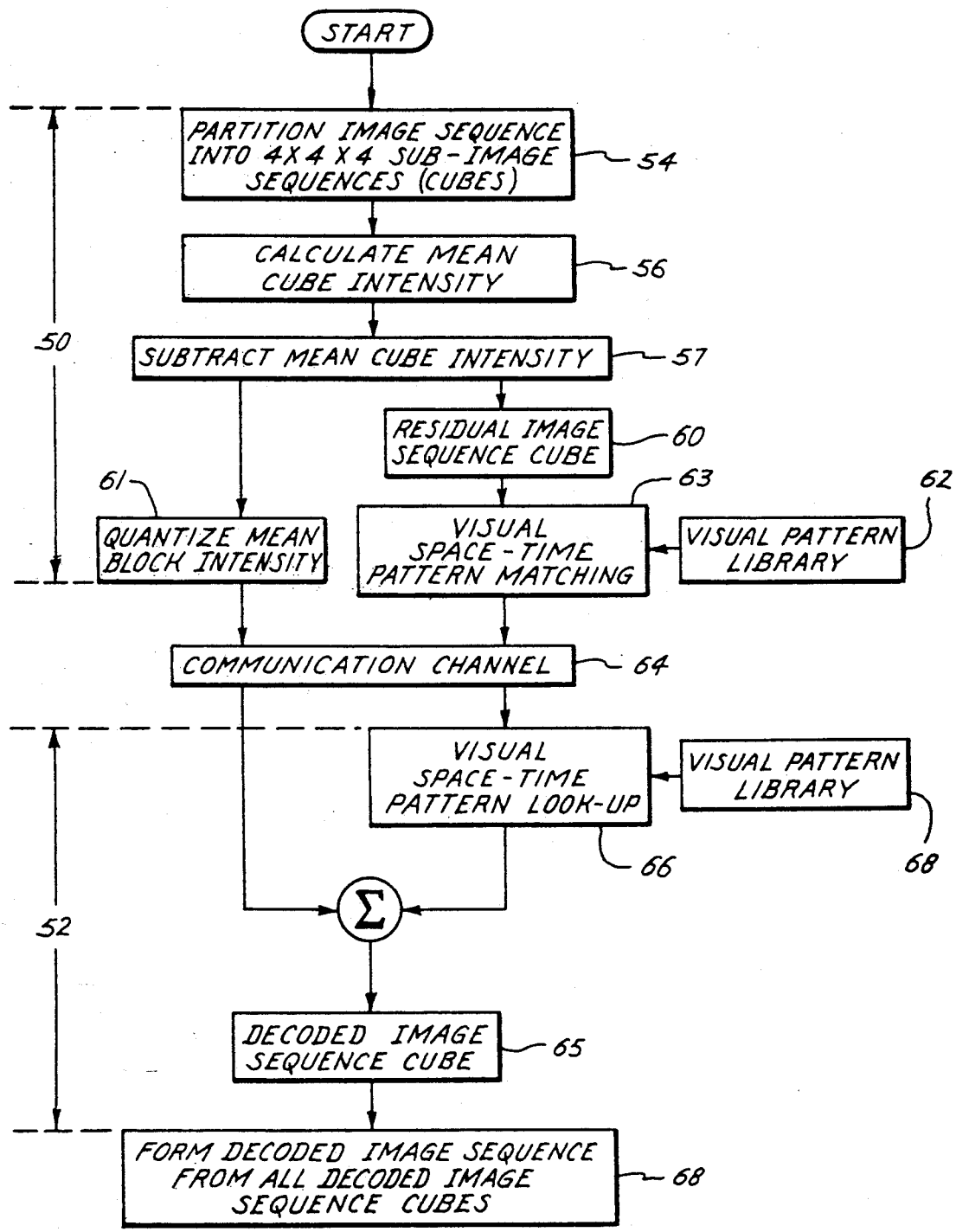
FIG. 10 is a flow diagram of the coding and decoding operations of an alternative preferred embodiment of the present invention utilizing VPISC methodology.

FIG. 10 is a flow diagram of the coding and decoding operations of the VPISC embodiment. The VPISC apparatus for coding, transmitting, receiving and decoding utilizes the same hardware initially shown in FIG. 1. However, instead of a two-dimensional array of pixels, digitizer 12, shown in FIG. 1, can be modified to produce a three-dimensional array of pixels with two space dimensions and one time dimension, with the intensity of each pixel being represented by a binary number. For example, digitizer 12 may produce three-dimensional arrays of image sequence data with 512×512 pixels spatial resolution, at a rate of 30 images/second. The overall transmission bandwidth which can be transmitted from transmitter 17 to receiver 18 can therefore be 512×512×30×8=62,914,560 bits/second.

CPU or microprocessor 16 can be any available microprocessor or work station as described above. In addition, an Intel/AMD386-based or 486-based compatible PC may also be used, or dedicated programmable signal processing chip, Motorola DSP56000 or DSP96000 series DSP signal processing integrated circuit may also be used. It is important to note that regardless of whether VPIC, VPISC, HVPISC, etc. is used, the hardware shown in FIG. 1 can easily be modified for still pictures or moving pictures depending upon the desired application.

If moving pictures are to be coded, transmitted, and decoded, FIG. 10 illustrates a flow diagram of various steps required to code, transmit and decode a pattern of moving pictures, according to the VPISC invention. The original image can be either monochromatic or color (three-channel) and can be either analog or digital. Similar to the VPIC embodiment, VPISC includes a series of coding steps 50 and decoding steps 52. Each digitized incoming image sequence from digitizer 12 is applied to block 54, where the time sequence of digital images is partitioned into a plurality of digital sub-image sequences (or image cubes). Each image sequence cube is of predetermined size, wherein the two-dimensional space having visually significant indicia. Preferably, two-dimensional space of each sub-image cube contains less than 10 visual discontinuities as determined by the spatial frequency and latency response curves of FIGS. 3a and 3b. Thus, the predetermined size and visual patterns of the spatial two dimensions represent natural images as perceived by a human observer as fully discussed above. In this alternative preferred embodiment, the sub-image sequence or sub-image cube is a 4×4×4 pixel locations and size. Thus, each sub-image cube in the preferred embodiment has 64 pixels arranged in an array within the cube's boundary. However, it is important to note that the size of the cube can vary depending upon the types of image sequences to be coded. If the image sequences are of low resolution type, then 5×5×5 or 6×6×6, etc. pixel arrays may be preferred for the sub-image cube size. In addition, partition sizes other than cubes can be used to represent the sub-image sequence if it is determined that the image is of relatively lower or higher resolution along one or two dimensions. Any sub-image size or shape is thereby feasible provided the size and shape are fixed as determined by the quality of the received end decoded images. For simplicity, and for the purpose of illustration, the following discussion will be directed to sub-image sequence cubes fixed in a 4×4×4 pixel space-time array.

After sub-image sequences are obtained, a mean cube intensity calculation step 56 is performed on each sub-image cube. Similar to the VPIC embodiment, mean intensity value is subtracted 57 from each pixel value within the 4×4×4 cube to obtain a residual image sequence cube 60. Residual pixels having intensity values greater than zero are represented with positive polarity and pixels having intensity values less than zero are represented by negative polarity as later shown in FIGS. 11-14. Various configurations of positive and negative polarity patterns correspond to the location and orientation of visual discontinuities within each image sequence cube. The number of different space-time patterns is fairly small. For example, 8 or 16 in number. The entire set of visual space-time patterns are stored in visual space-time library 62 of computer memory and are used to match against each residual cube in visual space-time pattern matching step 63.

Matching step 63 performs image gradient calculations on the residual sub-image cube to determine whether the residual sub-image sequence cube contains any visually significant discontinuities, or space-time edges. If no visually significant discontinuities, as determinable by a human observer exists, then only mean intensity value or mean cube intensity 61 is transmitted for that particular cube. If, on the other hand, matching step 63 determines that residual sub-image sequence cube contains a significant visual space-time discontinuity, the image gradient of the residual sub-image sequence cube is used to select the proper pattern from visual space-time library 62. It is the code retrieved from library 62 that is then transmitted along with mean cube intensity over transmission channel 64.

Similar to VPIC, VPISC decoder sequence 52 utilizes a pattern look-up step 66. Visual space-time pattern look-up 66 locates the space-time visual pattern from a visual space-time pattern library 68 using the received space-time visual pattern code. The cube gradient magnitude, if transmitted, and the selected space-time visual pattern are then multiplied to produce a scaled visual pattern. The scaled space-time visual sequence cube is then added to the uniform space-time sequence cube (which consists of pixel values all equal to the received quantitized mean cube intensity). The sum of the scaled pattern and uniform sequence cube represents the decoded version of the original sub-image sequence or sub-image cube. The summed scaled pattern and uniform sequence cube is decoded 65 and then assembled in proper order, in both time and space in step 68 to yield a decoded image sequence that closely visually approximates the incoming original image sequence.

Uniform sub-image sequence cubes are coded using a single indicia (mean cube intensity) so as to reduce the amount of coding needed for substantially redundant patterns associated with uniform sub-image sequences. It is the non-uniform cubes shown in FIG. 11 (i.e., static edge, changing edge and moving edge cubes) that receives additional coding operations since accurate discontinuity location in both space and time is crucial for achieving high-definition image representation.

In choosing the predetermined visual space-time patterns stored in visual space-time library 62 and 68, the sub-image sequence to be coded is first denoted as an indexed three-dimensional array $I=\{I_{i,j,k}\}$, where (i,j) represent samples in image space and where k indexes samples of the image sequence taken at time instants $t=t_k$. For simplicity, we assume that the original image sequence (shown in FIG. 4) to be coded is of 2N×2N pixel geometry and that the image sequence is of length 2M. This assumption is without loss of any generalities since sequences of other lengths can be decomposed into subsequences of length 2M', M'<M, and coded separately by VPISC. Odd-length sequences can be modified slightly either by deleting the additional image or by replicating it. Preferably, three-dimensional array, I, represents a union of disjoint 4×4×4 space-time sub-image sequence cubes, each of the form:

$$b_{i,j,k}=[I_{n,m,t}:4i\leq n\leq 4i+3, 4j\leq m\leq 4j+3, 4k\leq t\leq 4k+3]$$

Prior to assigning patterns to sub-image sequence cubes (step 63, FIG. 10), the mean intensities of the sub-image sequence cubes are coded separately (operations 56 and 61, FIG. 10), and the mean intensity is subtracted from the individual pixel values of the respective sub-image sequence cube (step 57, FIG. 10). This allows for the design of predetermined visual space-time patterns independent of the average intensity differences that occur between sub-image sequence cubes, hence reducing the number of required predetermined patterns.

In determining visual space-time patterns that accurately represent visually discontinuous sub-image cubes, a measure of the intensity variation, and specifically the space-time edge or discontinuity content of each sub-image sequence I, is the discrete gradient $(\nabla I=(\Delta_x I, \Delta_y I, \Delta_t I))$, where, within each sub-image sequence cube the directional derivative approximations $\Delta_x I = \Delta_x b_{i,j,k}, \Delta_y I = \Delta_y b_{i,j,k}, \Delta_t I = \Delta_t b_{i,j,k}$, are computed as oriented differences between weighted averages of contiguous average neighborhoods lying within each sub-image sequence cube. Computationally convenient definitions of the directional variations within each sub-image sequence cube are (for a 4×4×4 cube):

$$\Delta_x b_{i,j,k} = AVE\{I_{n,m,t}:4i+2\leq n\leq 4i+3, 4j\leq m\leq 4j+3, 4k\leq t\leq 4k+3\} - AVE\{I_{n,m,t}:4i\leq n\leq 4i+1, 4j\leq m\leq 4j+3, 4k\leq t\leq 4k+3\}$$

$$\Delta_y b_{i,j,k} = \text{AVE}\{I_{n,m,t} | 4i \leq n \leq 4i+3, 4j+2 \leq m \leq 4j+3, 4k \leq t \leq 4k+3\} - \text{AVE}\{I_{n,m,t} | 4i \leq n \leq 4i+3, 4j \leq m \leq 4j+1, 4K \leq t \leq 4k+3\}$$

$$\Delta_t b_{i,j,k} = \text{AVE}\{I_{n,m,t} | 4i \leq n \leq 4i+3, 4j \leq m \leq 4j+3, 4k+2 \leq t \leq 4k+3\} - \text{AVE}\{I_{n,m,t} | 4i \leq n \leq 4i+3, 4j \leq m \leq 4j+3, 4k \leq t \leq 4k+1\}$$

The (squared) spatial gradient magnitude and the space-time gradient orientation (a measure of the intensity change from one side of the space-time edge to the other, in space only) and the gradient orientation (a measure of the angle of the edge within the image sequence cube, in space only) within each sub-image sequence cube are given by:

$$(\nabla b_{i,j,k})^2 = (\Delta_x b_{i,j,k})^2 + (\Delta_y b_{i,j,k})^2$$

and $$\angle \nabla b_{i,j,k} = \tan^{-1}\left(\frac{\Delta_y b_{i,j}}{\Delta_x b_{i,j}}\right)$$

Note that a two-dimensional gradient magnitude and orientation is calculated over space only. Since the temporal characteristics of the image sequence generally has a different visual significance than the spatial aspects, the temporal derivative estimate $\Delta_t b_{i,j,k}$ is utilized separately. These derivative gradient magnitude and orientation estimates are then used to decide whether the sub-image sequence cube $b_{i,j,k}$ is a uniform image sequence cube, or some kind of static, moving edge, or changing edge discontinuous cube. Furthermore, as indicated by the above equations, it is sufficient to compute squared gradient magnitude since only the "index" or code is sent anyway—thereby not necessitating any further complex number computation.

Figure 11:
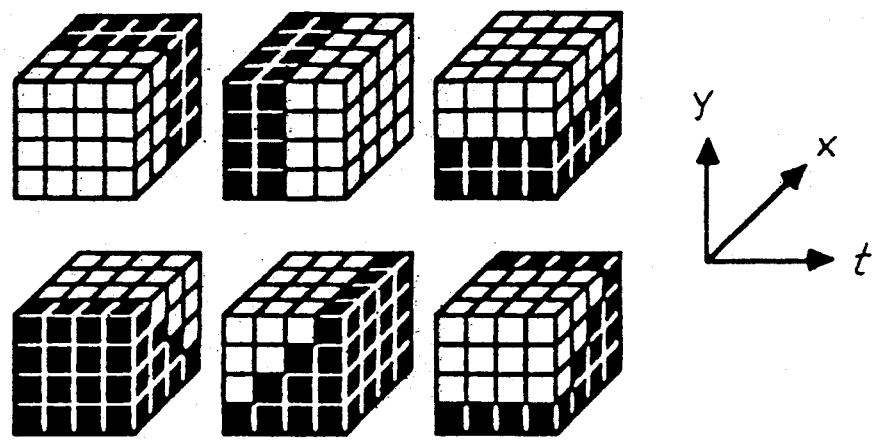
FIG. 11 is a set of conceptual three-dimensional sub-image sequence space-time cubes representing various forms of static, changing and moving sub-image sequences in accordance with the present VPISC process.

FIG. 11 depicts a set of conceptual sub-image sequence cubes over space-time having visual patterns used to represent coded non-uniform image sequence cubes. The computed spatial gradient magnitude and gradient orientation correspond to the contrast and the orientation of the intensity change within the sub-image sequence cube $b_{i,j,k}$. These quantities have continuous ranges, that according to the present invention, are quantized to simplify coding and transmission detail. Since small sub-image sequences are used, gradient orientation is quantized in 45° increments, yielding four basic edge patterns or edge sub-image sequences having directions of 90°, 45°, 0° and −45°. The remaining spatial edge orientations, 135°, 180°, 225° and 270° have the same orientations but have opposite contrast. These are coded, according to the present invention, by separately coding and transmitting a polarity bit (+ or −) along with the pattern code. Representative polarity bits used in VPIC are shown in FIGS. 5a–5d.

It should be noted that the arctangent function (a computationally inefficient function) is not actually used to calculate gradient orientation. Rather, since gradient orientations are quantized, constants can be stored for simple comparison with the directional variations $\Delta_x P_{i,j,k}$ and $\Delta_y b_{i,j,k}$.

The gradient magnitude transmitted through the communication channel depends on the type of pattern. There are four types of space-time sub-image sequence patterns that can be used, and which are determined by thresholding the cube spatial gradient and the time derivative approximations. This is determined with the use of a pre-determined threshold constant $|\nabla I|_{min}$.

The sub-image sequence cube is determined to be a uniform space-time cube or sequence if $$|\nabla b_{i,j,k}| < |\nabla I|_{min} \text{ and } |\nabla_t b_{i,j,k}| < |\nabla I|_{min},$$

in which case no gradient magnitude information is transmitted.

The sub-image sequence cube is determined to be a static edge space-time cube or sequence (i.e., static for only a certain period of time or sequence period) if $$|\nabla b_{i,j,k}| \geq |\nabla I|_{min} \text{ and } |\nabla_t b_{i,j,k}| < |\nabla I|_{min}$$

in which case the gradient magnitude is transmitted as computed above. This corresponds physically to an instance where the sub-image sequence cube contains intensity variations over space, which change very little or not at all over time.

The sub-image sequence cube is determined to be a changing edge space-time cube or sequence if $$|\nabla b_{i,j,k}| < |\nabla I|_{min} \text{ and } |\nabla_t b_{i,j,k}| \geq |\nabla I|_{min}$$

in which case the (squared) gradient magnitude is recalculated to include the time variation, and hence is the space-time gradient:

$$(\nabla b_{i,j,k})^2 = (\Delta_x b_{i,j,k})^2 + (\Delta_y b_{i,j,k})^2 + (\Delta_t b_{i,j,k})^2.$$

which is then transmitted as in the previous case. This corresponds to a physical instance where only the temporal derivative is above threshold, which usually occurs when an intensity edge moves very quickly across a space-time cube.

Finally, the image sequence cube is determined to be a moving edge space-time cube or sequence if $$|\nabla b_{i,j,k}| \geq |\nabla I|_{min} \text{ and } |\nabla_t b_{i,j,k}| \geq |\nabla I|_{min},$$

in which case the (squared) gradient magnitude is again recalculated to include the time variation and then transmitted as in the previous case. This corresponds to a physical instance where both derivative quantities are above threshold, which will occur when an intensity edge moves across a space-time cube slowly enough that intensity information is registered. Thus, "uniform" and "changing" cubes represent no discontinuities during the sub-image time period. Conversely, "static" and "moving" cubes represent discontinuities which occur during the sub-image time period.

Figure 12:
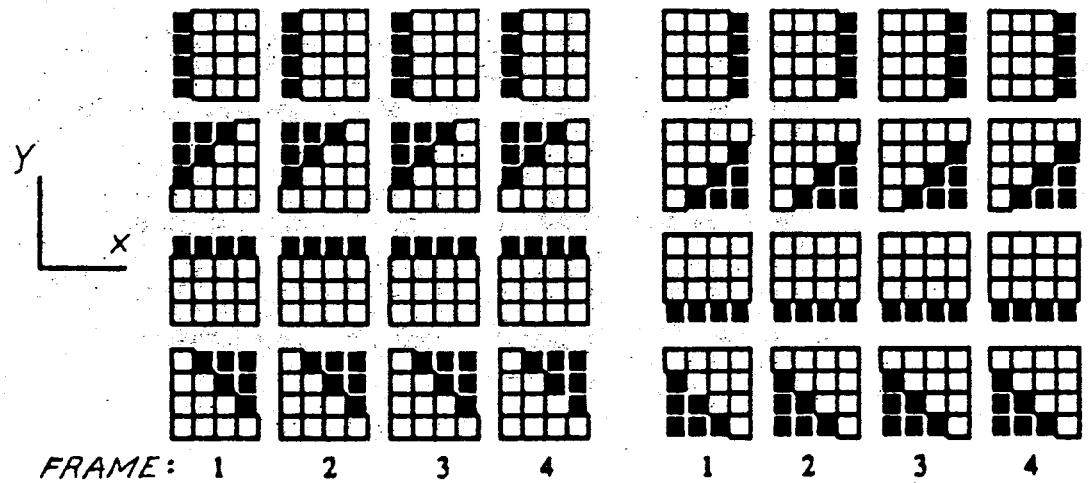
FIG. 12 is a set of static edge sub-image space-time patterns shown in two dimensions and used for VPISC coding and decoding in accordance with the present invention.
Figure 13:
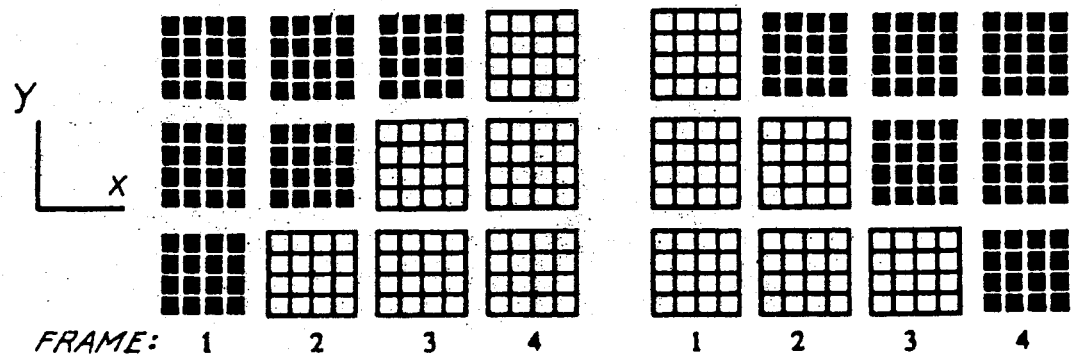
FIG. 13 is a set of changing sub-image space-time patterns shown in two dimensions and used for VPISC coding and decoding in accordance with the present invention.
Figure 14:
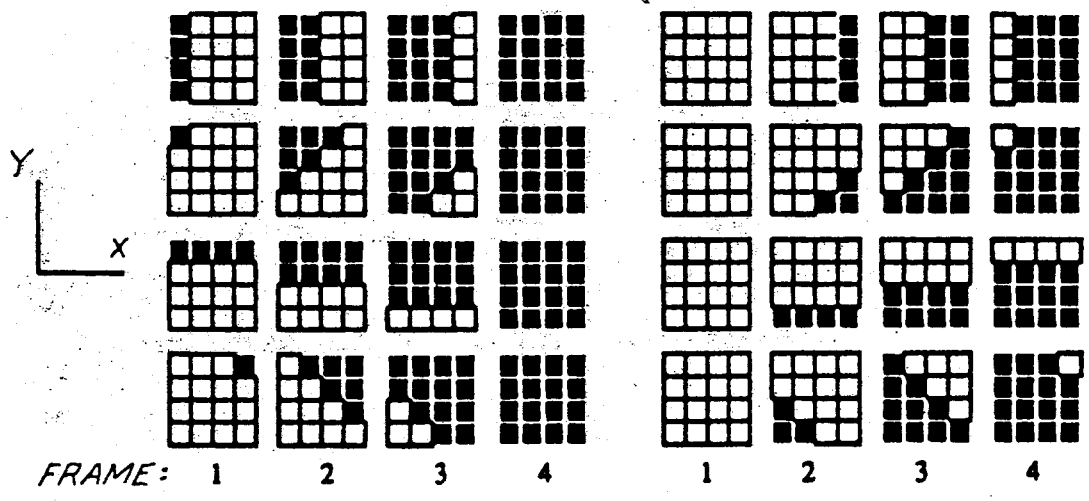
FIG. 14 is a set of moving sub-image space-time patterns shown in two dimensions and used for VPISC coding and decoding process in accordance with the present invention.

FIGS. 12–14 illustrate possible combinations of visual space-time patterns or component time frames of non-uniform sub-images. The "break" between positive and negative polarity represents the orientation and location of the edge in space and in time. Positive or negative polarity is shown represented by lighter and darker disjunctive regions. FIG. 12 shows various forms of static edge cubes broken into four time frames each. As shown, the static edge orientation or discontinuity remains constant for the sub-image time duration. FIG. 13 shows various forms of changing edge cubes broken into four time frames each. As shown, the changing edge has no discontinuity shown for the sub-image time duration, however, opposing contrasts appear during the sub-image time duration. A truly uniform cube would have the same contrast throughout the entire sub-image time duration. FIG. 14 shows various forms of moving edge cubes broken into four time frames each. The edge is shown moving from one time frame to the other.

The visual space-time pattern shown in FIGS. 12-14 may be used in full, or a subset of these patterns may be used. Still further, some modified versions of the patterns may be used depending upon the desired application. It is important to observe that the patterns depicted in FIGS. 12-14 have been found to code many varying patterns of sub-image sequences in an efficient and effective manner.

In one embodiment of the VPISC convention, transmitted along with coded representations of the matched visual space-time patterns is the sub-image sequence gradient magnitude computed as above. Gradient magnitude is a quantized value assigned to each pixel location in accordance with the binary coded representation of that quantized value. If either the spatial intensity difference between any two (spatial) halves of an image sequence cube is large, or if the temporal intensity difference of the two temporal halves of an image sequence cube is large, or if both are large, then the respective gradient magnitude will also be large. However, if the difference is small in both cases, then the gradient magnitude will be small. Along with magnitude, gradient polarity is transmitted digitally to indicate which side of the space-time edge has the higher average intensity value. As will be shown below, the gradient intensity range can be limited and heavily quantized without severely limiting the intensity contrast of the decoded image. In addition, the gradient magnitude need not be transmitted at all (if some very small image sequence quality degradation can be accepted), and the decoder can use a predetermined gradient magnitude without significant degradation of image sequence quality.

As with the VPIC embodiment, VPISC uses a low threshold, $|\nabla I|_{min}$, to represent the minimum perceivable space-time gradient magnitude that can occur in a select time interval of a sub-image sequence. Furthermore, a high threshold, $|\nabla I|_{max}$, is used to denote the maximum gradient magnitude that is coded distinctly, with all gradient values above that being truncated While $|\nabla I|_{min}$ effectively determines the number of space-time edges or patterns in the sub-image sequence, the remaining sub-image sequence cubes which do not exceed the minimum are coded as uniform sub-image sequences. Conversely, those sub-image sequences which exceed the minimum are coded as static, changing or moving edge sub-image sequences.

The attainable coding efficiency using VPISC depends upon the resolution that is taken along the time axis. However, assuming that 4×4×4 sub-image sequence cubes are used, and that the original image sequence data is 512 pixels/image by 8 bits/pixel by 30 images/second and that $n_u$ bits are used to code uniform sub-image sequence cubes (mean cube intensity) and $n_e$ bits are used to code space-time edge cubes (mean cube intensity, polarity, pattern index, and gradient), then the overall range of compression, $C_{VPISC}$, obtainable is:

$$\frac{512}{n_e}:1 \leq C_{VPISC} \leq \frac{512}{n_u}:1$$

For example, using the values $n_u=6$ and $n_e=7$, a compression range 73:1 $C_{VPISC}\leq$85:1 is obtained. While there is a significant reduction, even greater gains can be achieved with modifications described later, HVPISC, AVPISC, and FVPISC, all of which utilize VPISC as the essential operation.

With an understanding of VPISC, hierarchical VPISC (HVPISC) is now described. HVPISC is best understood by observing that there is considerable evidence indicating that visual images are perceived and separately processed over a range of spatial scales, or to a good approximation by tuned spatial frequency channels, in higher mammalian vision systems. D. Marr, *Vision*, San Francisco, W. H. Freeman and Co. (1982); H. R. Wilson and J. R. Bergen, "A Four-Mechanical for Threshold Spatial Vision", *Vision Res.*, vol. 19, pp. 19-32 (1979). The information extracted at different scales is apparently integrated later to construct a complete representation. Thus, multi-resolution or hierarchical processing methodologies are proposed as being substantially compatible with human perception methodology.

Figure 15:
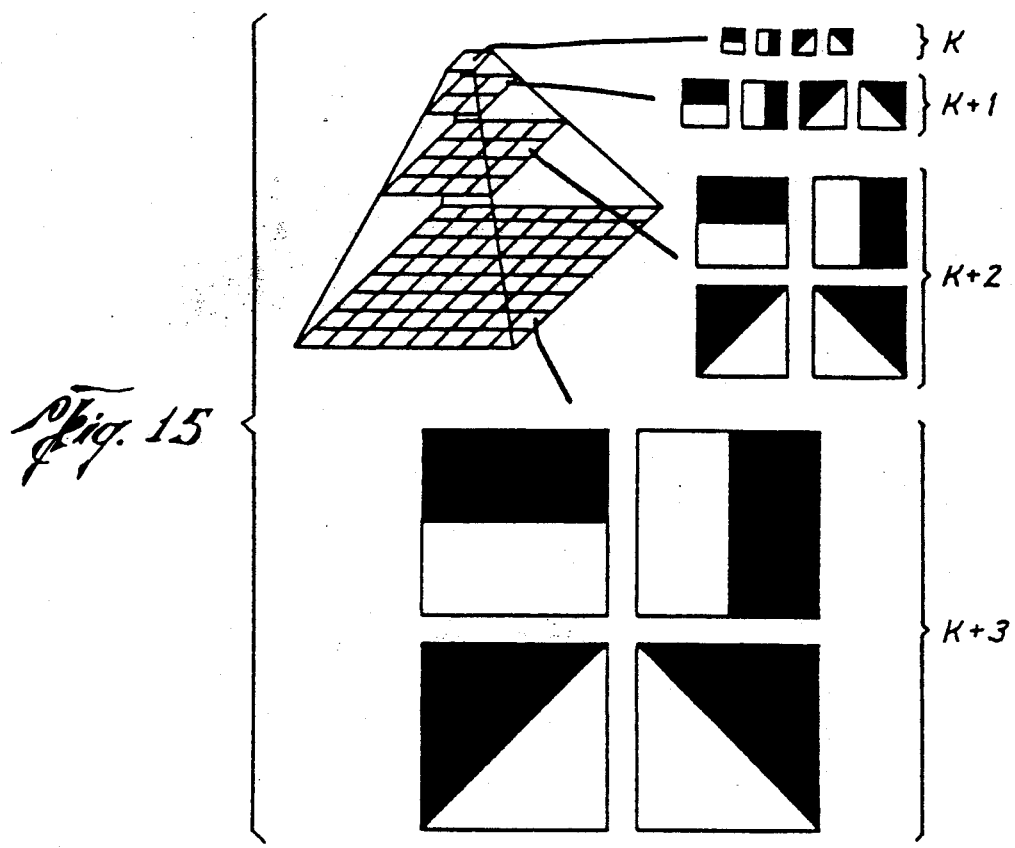
FIG. 15 is a hierarchical HVPISC scheme of varying resolution levels shown in two dimensional spatial configuration in accordance with the present invention.

A hierarchical system of multi-resolution patterns can best be illustrated in FIG. 15. Shown in FIG. 15 is a pyramid having a lowest level of resolution at the top of the pyramid and higher levels of resolution as you proceed toward the base of the pyramid. The top layer or lowest resolution level may represent a single pattern image of which can be partitioned into various sub-images, wherein each sub-image represents high resolution partitions proceeding toward the base of the pyramid. By using this hierarchical scheme, certain patterns of an overall image may require higher resolutions while other patterns may not. If high resolution is needed, then coding operations can proceed down toward the highest resolution level. Conversely, if uniform cubes of non-important regions are encountered, only the lowest resolution level may be needed. In hierarchical coding, operations begin at the highest level of the pyramid and may proceed (depending upon the amount of resolution and complexity need) down toward the bottom of the pyramid. By using this pyramid or hierarchical scheme, coding complexity can be substantially reduced in non-important regions and the efficiency of the overall coding algorithm can thereby be substantially increased.

The pyramid of FIG. 15 is shown for hierarchical VPIC such that the image at any level in the pyramid has twice the resolution of the image at the next lowest resolution level. Assuming that the original, full resolution image ($I_{i,j}$) to be covered is $2^n \times 2^n$ and that L is less than or equal to N levels within the pyramid representation, image at the Kth resolution level is denoted:

$$I_i=(I_{i,j}{}^k); k=1,2,\ldots L$$

where $I_L=I$; hence the lowest resolution image in the pyramid is the $2^{N-L+1}\times 2^{N-L+1}$ image $I_1$. High resolution images can be used to create lower resolution images via a Reduce process: a pixel in $I_{i-i}$ is the average of pixels in a 2×2 cube of image $I_i:I_{i-1}=$Reduce ($I_i$) if $$I_{i,j}{}^{k-1}=(I_{2i,2j}{}^k+I_{2i,2j+1}{}^k+I_{2i+1,2j}{}^k+I_{2i+1,2j+1}{}^k)/4$$

Conversely, an Expand process creates higher-density images which can be placed lower in a pyramid: $I_k=$Expand $(I_{k-1})$, where $$I_{2i,2j}{}^k=I_{2i,2j+1}{}^k=I_{2i+1,2j}{}^k+I_{2i+1,2j+1}{}^k=I_{i,j}{}^{k-1}$$

It is important to realize that the Expand operation is not the inverse of the Reduce operation, and does not truly create higher-resolution images. Information is irretrievably lost in the Reduce operation. Rather, Expand is used to create images having the same dimensions upon which point-to-point operations can be defined. The Reduce operation, however, can be iteratively applied to create a pyramid of images of successively lower resolutions, where each level in the pyramid primarily contains lower frequencies from the immediately higher-resolution image in the pyramid.

Figure 16:
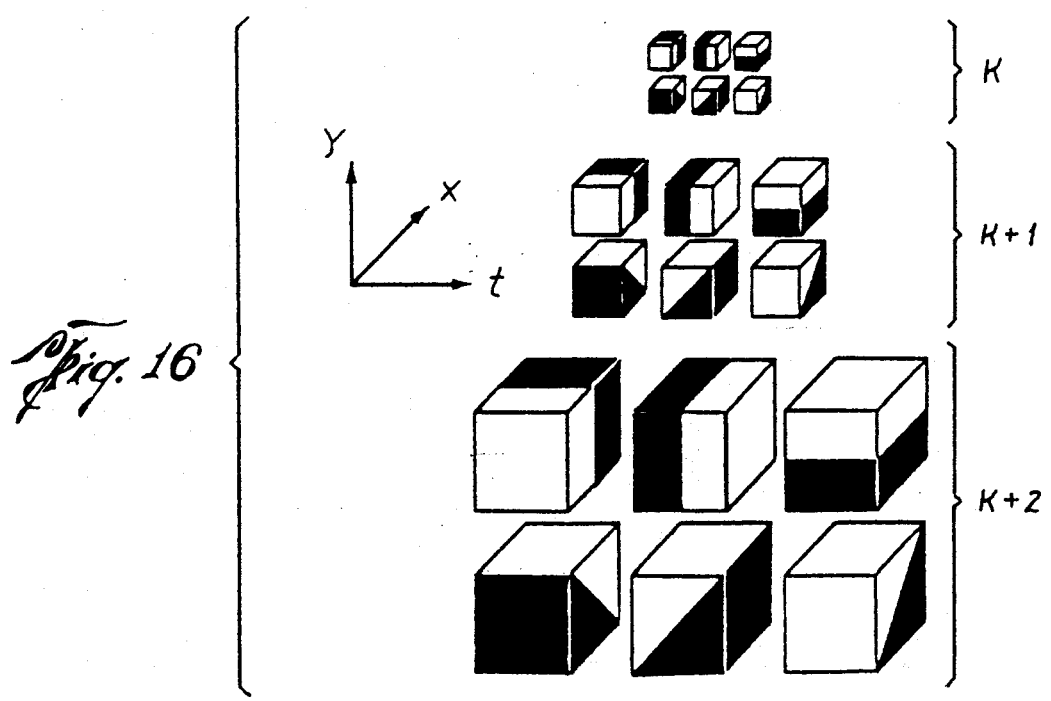
FIG. 16 is a hierarchical configuration of sub-image space-time cube patterns shown in three dimensional and at varying resolution levels used for HVPISC coding and decoding process in accordance with the present invention.

FIG. 16 illustrates the same pyramid of the two-dimensional cube arrangement of FIG. 15 but in a three-dimensional cubic environment necessary for HVPISC embodiment. The HVPISC implementation can be regarded as a multi-resolution VPISC method. The first step of the HVPISC implementation is to construct a sub-image sequence pyramid as shown in FIG. 16 where a sub-image sequence pixel of a higher level I or K is the average of a 2×2×2 image sequence cube of the lower level I-1 or K-1. Thus, the higher level sub-image sequences in the pyramid contained lower resolution sub-image sequence information, while the lower level sub-image sequences in the pyramid contain high-resolution sub-image sequence information. In HVPISC, the sub-image sequence information at each level I is coded separately using the VPISC technique outlined above. This procedure is now briefly described. Suppose the sub-image sequence at level k has been coded, then an approximation of the image sequence at level k+1 can be obtained by increasing the effective, but not the true, resolution by duplicating each pixel eight times to create 2×2×2 sub-image sequences, i.e., the coded sub-image sequence at level k. Subtracting the expanded sub-image sequence from the original sub-image sequence at level k+1 yields a residual image sequence that is coded using the VPISC technique. Thus, except at the lowest level of the pyramid, the residual image sequences are coded rather than the actual pyramid of image sequences. This process starts from the top of the pyramid (lowest resolution) and proceeds through successively higher resolutions through the bottom of the pyramid. In this way, most of the coding overhead (computation and information representation) is expended at the low resolution levels, making HVPISC very efficient. It has been found that the HVPISC implementation of VPISC invites noticeably superior image sequence coding quality at higher compressions than is feasible using only the VPISC implementation, and with only a slight increase in computation. It should be noted that the coding hierarchy can be limited to a spatial hierarchy (two-dimensional HVPISC), although three-dimensional space-time visual patterns are the preferred application as described above and in FIG. 16.

The non-uniform VPISC methods AVPISC and FVPISC modify HVPISC by first coding the image sequence using HVPISC, but then transmitting those portions of the HVPISC-coded data that correspond to either sufficient space-time detail (in AVPISC) or to a localized region in space-time (FVPISC). Both VPISC and HVPISC, and the modifications AVPISC and FVPISC, as already defined, can be efficiently implemented to code and decode, in real time, space-time image sequences due to the simplicity of the computations involved.

Colored versions of VPISC, HVPISC, AVPISC, and FVPISC are easily defined, which achieve further increased gains in compression efficiency exploiting the redundancy between color image-sequence components. In color VPISC, the redundancy that exists between the different color components (red, green, blue—RGB) is exploited by using the same orientation of visual space-time pattern at each physical image sequence coordinate when coding the R, G, and B images otherwise separately. This technique is motivated by the fact that the colors in image sequences generally follow similar patterns of variations, only differing in their average intensity attributes.

Figure 17:
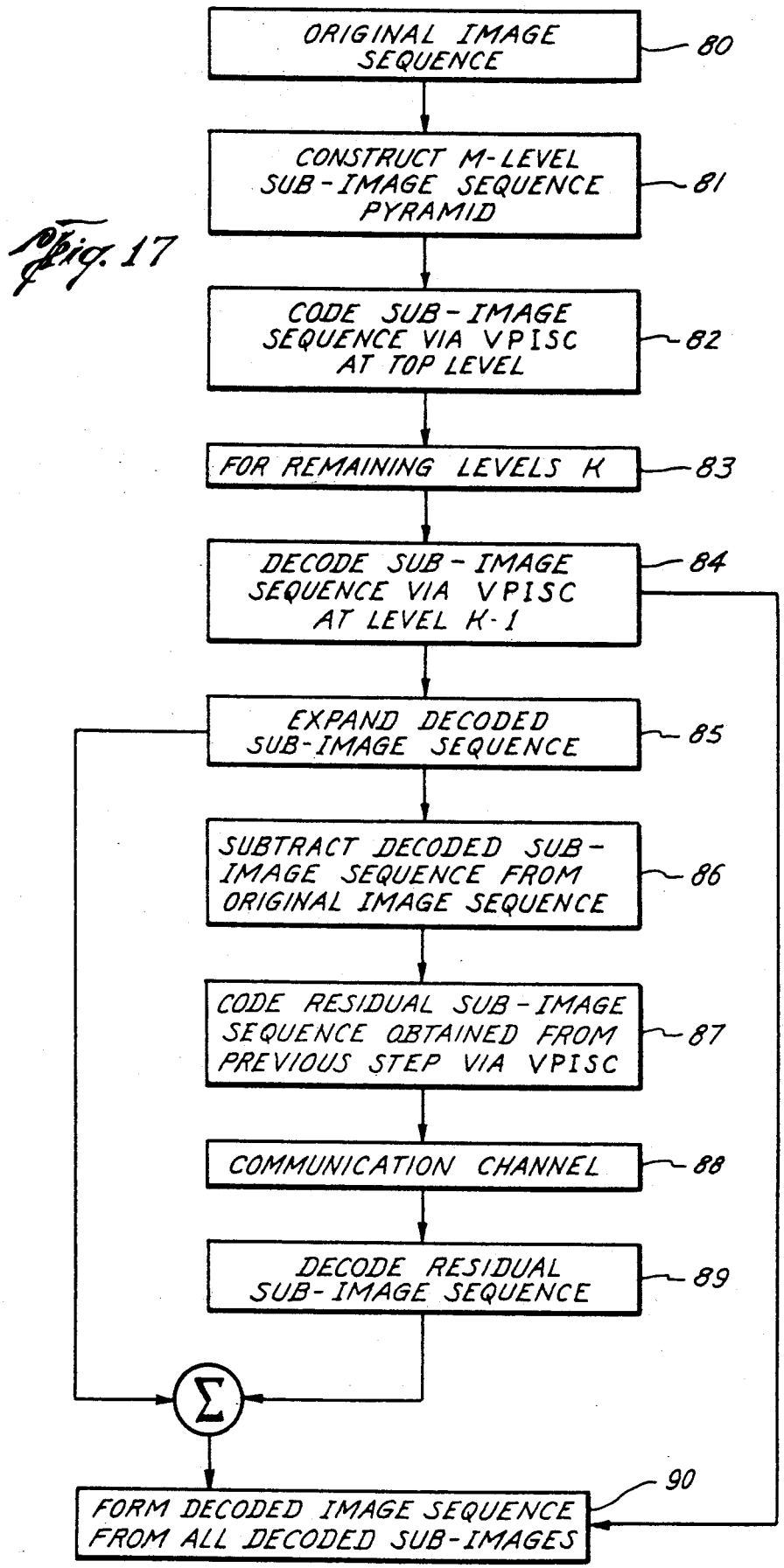
FIG. 17 is a flow diagram of the coding and decoding operations of the HVPISC process in accordance with the present invention.

To more fully define and characterize the HVPISC implementation, FIG. 17 illustrates a flow diagram of the HVPISC coder, communication channel, and decoder. First, from the original image sequence 80, an M-level sub-image sequence pyramid 81 is constructed, wherein each image sequence is partitioned in a plurality of sub-image sequences arranged in hierarchical levels k−1, k, k+1, etc. Each pixel in level k is, e.g., the average of 2×2×2 (16) sub-image sequence cubes at level k+1. For the sake of efficiency, the top level may not necessarily be a single pixel. Instead, the top level may be 4×4×4, 8×8×8, or even 16×16×16 sub-image sequence cubes. The image sequences in the pyramid are referred to as original image sequences as shown in cube 80.

For simplicity, assume that N×N×M, where N, the dimension of one frame, is a power of 2, and M, the number of frames, is a multiple of a small power of 2, say, $2^5$ (the reason for this will become apparent below). The algorithm is easily modified to accommodate other cases. Let $I^{(0)}$ be the original image sequence to be encoded (the superscript will be used to indicate the hierarchy level being considered), and let $I^{(0)}_{i,j,k}$ be the value of the $j^{th}$ pixel in the $i^{th}$ column of the $k^{th}$ frame. Begin by generating a series of subsampled, successively smaller and shorter sequences that are reduced using the formula:

$$I^{(n)}_{i,j,k} = AVE\left(\begin{array}{cccc} I^{(n-1)}_{2i,2j,2k}, & I^{(n-1)}_{2i+1,2j,2k}, & I^{(n-1)}_{2i,2j+1,2k}, & I^{(n-1)}_{2i,2j,2k+1}, \\ I^{(n-1)}_{2i,2j,2k+1}, & I^{(n-1)}_{2i+1,2j,2k+1}, & I^{(n-1)}_{2i,2j+1,2k+1}, & I^{(n-1)}_{2i+1,2j+1,2k+1} \end{array}\right) \text{ for } n > 0$$

The series ($I^{(n)}$:n=0,1,...p) forms a resolution pyramid with p+1 levels, where the bottom level $I^{(0)}$ represents the full resolution (N×N pixels×M frames) image sequences and the sub-sampled $I^{(n)}$ is $(N/2^n) \times (N/2^n)$ pixels×$(M/2^n)$ frames. This pyramid is the reason for the restrictions on M and N.

The sequences are encoded in the reverse order from that in which they were generated. After each sequence, with the exception of $I^{(0)}$, is encoded using VPISC, it is immediately decoded using the VPISC decoder. Let the decoded version of $I^{(n)}$ be denoted $D^{(n)}$. Then $D^{(n)}$ is expanded by replicating each pixel 8 times to create a 2×2×2 constant sub-image sequence. It is important to note that expanded decoded sub-image sequence cube 85 is utilized for all the remaining levels I above the original or lowest level I−1. A difference, or residual, image sequence, $R^{(n-1)}$ is then created as shown in cube 86 by the formula:

$$R_{x,y,t}^{(n-1)} = I_{x,y,t}^{(n-1)} - \text{expand}\{D_{i,j,k}^{(n)}\}$$

for (x, y, t) ∈ {(2i,2j,2k), (2i+1,2j,2k), (2i,2j+1,2k), (2i+1,2j,2k), (2i,2j,2k+1), (2i+1,2j,2k+1), (2i+1,2j,2k+1)}. The residual image sequence $R^{(n-1)}$ represents the coding error at pyramid level n−1, and it is this difference image which is actually coded using VPISC at each level except for level p. The formula indicates how residual sub-image sequences are coded in cube 87 by subtracting decoded sub-image sequence from original image sequence of cube 86 for all remaining levels indicated by cube 83.

Thus, HVPISC coder starts from the top of the pyramid (the lowest resolution) and progresses down to the bottom of the pyramid (the highest resolution). First, the top level original image sequence is coded using the preferred VPISC coder 50 described in FIG. 10. After this step, the rest of the original image sequences in the pyramid are coded individually as shown in cube 83 of FIG. 17. At each level, the previous VPISC-coded image sequence (from the next higher level in the pyramid) is first decoded using a VPISC decoder 52 shown in FIG. 10 and further illustrated in cube 84 of FIG. 17. The decoded image sequence is then expanded in cube 85 by replicating each pixel eight times to create a constant 2×2×2 cube so that it has the same size as the original sequence at that respective level. A new residual image sequence is created as shown in cube 87 by subtracting the expanded encoded image sequence from the original image sequence as shown in cube 86. The new residual image sequence is then coded using the VPISC coder 50 of FIG. 10. This entails visual space-time pattern matching and visual space-time pattern library look-up, etc. Thus, the preferred HVPISC coder employs the VPISC coder and decoder repeatedly in the coding process.

A preferred HVPISC decoder operates in two different modes. If the image to be decoded is the top image in the pyramid, the preferred HVPISC decoder is identical to a VPISC decoder of FIG. 10. For image sequences at other levels, the image sequence decoder of the VPISC decoder only recovers the residual image sequence of cube 87. The residual sub-image sequence is then decoded according to cube 89 after traveling through communication channel 88. The decoded residual sub-image sequence is then added to the expanded decoded sub-image sequence to recover the original image sequence at each respective level.

The space-time visual pattern library at each level of the pyramid can be the same or different as long as the coder and decoder at each level uses the same space-time visual pattern library.

Similar to the VPISC methodology, the original sequence of digital images can be reproduced via arranging each decoded sub-image sequence obtained by adding decoded residual sub-image sequences and expanded sub-image sequences in both space and time as shown in cube 90.

Now that the basic VPISC and HVPISC embodiments are understood, it is important to note that operator manipulation upon the hierarchical levels of the HVPISC can be achieved depending upon the desired outcome. In particular, an operator can manipulate the depth of the hierarchical coding across the entire original image sequence or only at specific, selective portions of that sequence. In particular, AVPISC and FVPISC can utilize those forms of manipulation.

In describing AVPISC embodiment, it is important to note that most image sequences contain some regions containing fine visual detail and other regions containing primarily relatively uniform regions. Here, we take "regions" in the three-dimensional sense, observing that some regions contain visible motion and others do not. Uniform non-motion regions are well-represented by a single intensity value. Thus, very few bits should be required to encode them. Furthermore, the hierarchical structure of HVPISC is well-suited to the task of finding these regions. Conceptually, all that is required is to apply a test after the encoding of each resolution level to determine if each cube or cube is adequately represented. If it is not, it is not necessary to transmit higher-resolution information about that particular cube.

In practice, a useful and easy-to-implement test is to simply encode the entire image sequence using a non-adaptive version of the HVPISC algorithm and examine the output. Areas which require little adjustment at high resolution must have been adequately coded at some lower resolution. Since HVPISC is very fast, there is little computational sacrifice in doing this. However, a simple modification of the HVPISC algorithm to adapt to varying uniform or non-uniform regions is simple to implement. First, the images encoded, using the standard HVPISC algorithm such as that described above, and a record is kept of the coding at each level. Then, an octree is built from the bottom-up by examining the coder's output at each cube. The octree tells the coder which cubes to transmit and the decoder, which cubes to expect. As defined herein, an octree is a generic term describing a tree or graph having a node from which eight children are derived. Thus, in HVPISC of the present invention, each node or cube can be described by eight children or smaller cubes placed lower in the pyramid as described above.

The octree is built in the following manner. Each bit in the octree represents one cube at some pyramid level. Let $O^{(n)}$ denote the octree level corresponding to the image $I^{(n)}$. Then $O^{(n)}$ has $(N/2^{(n+2)} \times N/2^{(n+2)} \times M/2^{(n+2)})$ elements. As before, let $O^{(n)}_{i,j,k}$ denote the $i^{th}$ bit in the $j^{th}$ column of the $k^{th}$ "frame" in the $n^{th}$ level of the tree. First mark each bit at the lowest level as terminal if no edge was detected and no large correction of the mean occurred at the corresponding cube. That is, $O^{(o)}_{i,j,k} = 0$ if no significant detail at that cube, and $O^{(0)}_{i,j,k} = 1$ otherwise.

Note that a large correction of the mean indicates that a cube differs from its immediate spatial or temporal neighbors. Thus, there is local detail or motion at the scale presently under consideration. At higher levels, each bit is then processed as follows:

$$O^{(n)}_{i,j,k} = O \text{ if} \begin{bmatrix} (O^{(n-1)}_{2i,2j,2k} = 0) \text{ and } (O^{(n-1)}_{2i,2j,2k+1} = 0) \text{ and} \\ (O^{(n-1)}_{2i,2j+1,2k} = 0) \text{ and } (O_{2i,2j+1,2k+1} = 0) \text{ and} \\ (O^{(n-1)}_{2i+1,2j,2k} = 0) \text{ and } (O_{2i+1,2j,2k+1} = 0) \text{ and} \\ (O^{(n-1)}_{2i+1,2j+1,2k} = 0) \text{ and } (O_{2i+1,2j+1,2k+1}1 = 0) \end{bmatrix}$$

else $O_{i,j,k}{}^{(n)} = 1$.

If $O_{i,j,k}{}^{(n)}$ is set to be 0, it is considered terminal and its octree descendants are discarded. A terminal cube is considered to be adequately encoded.

The coder only sends, and the decoder only processes, information pertaining to those cube whose corresponding octree nodes have no terminal ancestor. Sub-cubes of a terminal cube are simply ignored; they generally contain, at most, minor corrections.

The octree is a very inexpensive structure to calculate and transmit. The calculation requires only between one to ten bit comparisons per node. In the worst case, $$1 + 8 + \ldots + \left(\frac{N}{2^3}\right)^2 \left(\frac{M}{2^3}\right) \approx \frac{N^2 M}{448} \text{ bits}$$

must be calculated and transmitted (note that there is no need to transmit the lowest, most expensive, level of the octree). Since there are $N^2 M$ pixels in the image sequence, this is a maximum cost of only 0.002 bits per pixel.

FVPISC is identical to AVPISC except in the generation of the octree. In FVPISC, a two-dimensional region of interest is specified by some means such as with a mouse, or it might be automatically specified by a computerized image tracking system. The region may be represented as a circle with center ($i_0$, $j_0$) and radius r. Then generate the octree using:

$O_{i,j,k}{}^{(n)} = 0$ if
$<[(4 \times 2^n)i - i_0]^2 + [(4 \times 2^n)j - j_p]^2 > [(n+1)r]^2>$ else $O_{i,j,k}{}^{(n)} = 1$.

Thus, the information within the region of interest is encoded fully, but outside that region is a series of annular regions which are coded at successively lower resolutions. This results in significantly lower bit rates while preserving the quality of the most interesting portion of the image, along with some lower-resolution information about the context or background. Such an approach is extremely useful since the solid cone of visual high fidelity of the human eye is quite small; most of the visual field is perceived with some resolution degrading rapidly away from the fovea. Note that $O_{i,j,k}{}^{(n)}$ not depend on k, but this definition allows the use of the same decoder for FVPISC as is used for AVPISC.

Figure 18:
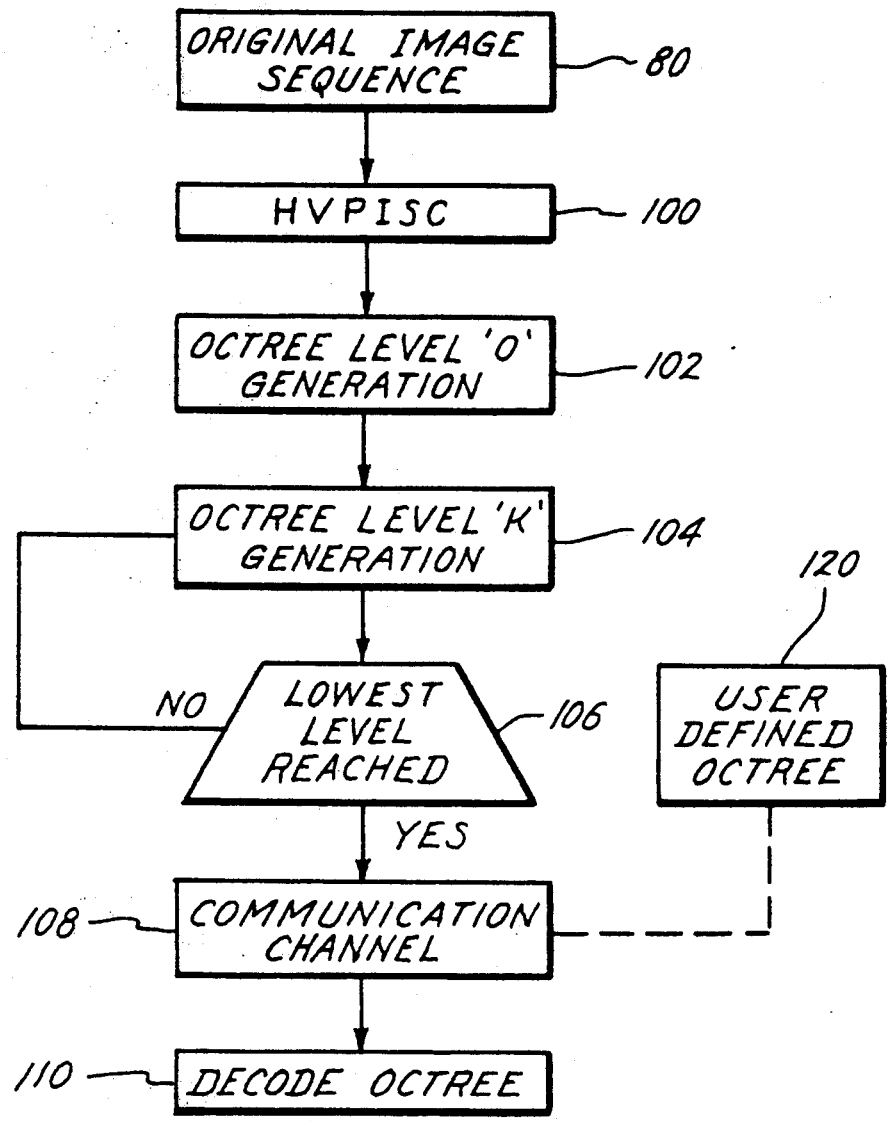
FIG. 18 is a flow diagram of the coding and decoding operations of the AVPISC and FVPISC process in accordance with the present invention.

Referring to FIG. 18, AVPISC and FVPISC methodology is shown incorporating HVPISC within an octree environment. Both AVPISC and FVPISC utilize an original image sequence 80 being processed similar to HVPISC, shown in FIG. 17, as indicated by reference numeral 100. An AVPISC octree is generated beginning at the highest resolution level, or level "0", and determining if that cube should be given a value of "1" or "0". If there is no significant detail at level 0, then a 0 value will be assigned to that cube. If the cube has a value of 0, then that node is considered terminal and its octree children are discarded. Conversely, if the cube has a value of 1, then that node, along with its children are transmitted. This process begins at level n=0 and continues for all levels n=k as shown by reference numerals 102 and 104. Once the lowest resolution level is reached, 106, the entire octree and codes for all 0 nodes are sent over communication channel 108. Decode octree 108 then reconstructs the final image from the transmitted information codes using octree as a guide to determine which information was sent.

While reference numerals 100-110 illustrate steps for AVPISC methodology, FVPISC is also incorporated in FIG. 18. FVPISC allows the user to define an octree 120 which can then be transmitted directly within the communication channel, as described above.

An alternative preferred embodiment of the present invention involves digital coding of color image sequences. It is understood that the present method of coding sequences of color images comprises the same form or methodology of VPISC. However, each chromatic image is processed separately by separate coding and decoding schemes and then combined in both space and time to form a decoded sequence of color images: each color image being superimposed red, green, and blue chromatic image sequences. In color television broadcasting, YIQ representation can also be made according to NTSC standards as described above.

In RGB images, a green sub-image cube is used for the extraction of pattern information, since as is well known the human eye is most sensitive to this component. The present invention is applied to the green color separated image sequence to obtain the mean intensities and space-time edge pattern of each green image sequence cube. The red and blue color separated components are simply assessed for mean intensity, but no space-time pattern information is extracted and coded for these. Decoding proceeds simply as well. The green image sequence is decoded as described above for the monochromatic image sequence, and the red and blue image sequences are decoded using the transmitted red and blue mean intensities, and the patterns obtained from the green image sequence. Thus, considerable savings (increase) in the compression rate and in the coding complexity are achieved.

It should be noted that color image sequence coding proceeds in VPISC as described above. In HVPISC, AVPISC, and FVPISC, which code images by utilizing VPISC as the essential coding operation, each application of VPISC to the image sequence data proceeds as described above.

Similarly, in YIQ image sequences, the luminance is used to obtain mean luminance intensities and space-time edge patterns for each luminance image sequence cube, and the hue and saturation signals are assessed only to determine the mean intensities. The luminance image sequence is decoded using the transmitted mean and space-time pattern information for the luminance cubes, and the hue and saturation image sequences are decoded using the transmitted hue and saturation (respectively) mean intensities, and the space-time edge patterns obtained from the luminance image sequence.

The foregoing description of the invention VPISC and the modifications HVPISC, AVPISC, and FVPISC have been directed towards particular preferred and alternative embodiments of the present invention. It will be apparent, however, to those skilled in the art that modifications and changes in method may be made without departing from the scope and spirit of the inventions. For example, instead of using $4 \times 4 \times 4$ pixel arrays, any size of pixel arrays may be used providing the size of array yields satisfactory image sequence quality. Also, the size of the visual space-time pattern library can be varied depending on the number of visual space-time patterns necessary for the given application. Still further, it is important to note that either monochromatic or color images can be coded and decoded without deviating from the present invention. Therefore, it is the applicants' intention in the following claims to cover all equivalent modifications and variations, including those described herein, which fall within the true spirit and scope of the inventions.

The following are source code listings, written in C-language, for: the program used to code an image sequence using VPISC (hcode.c and hedge.c); the program used to decode an image sequence using VPISC decoder (hdcode.c); the program used to decode an image sequence according to octree (recon.c); the program used to csh script for two-dimensional HVPISC and three-dimensional HVPISC (hier and hier3d); the program used to csh script for AVPISC and FVPISC (hierad and hierfov); the program used to expand an image sequence in two-dimension using pixel replication and three-dimension using pixel replication (expan.c); the program used to csh script to expand an image sequence in three-dimension (expan3d.c and expan3ds.); the program used to reduce an image sequence and two-dimension and to reduce in three-dimension (reduc.c and reduc3d.c); the program used to csh script to reduce an image sequence in three-dimension (reduc3ds.); the program used to generate an octree from coding data for AVPISC and for generating an octree from parameters for FVPISC (maketree.c and maketreef.c); the program to count bit usage for AVPISC and to count bit usage for FVPISC (readbits.c) and readbitsf.c); program used to generate space-time visual pattern code book and pattern definitions (book.c and edge.h). Copyright, 1991, The University of Texas System. The above program is as follows:

What is claimed:

1. A method of processing a time sequence of digital images, comprising:
    partitioning a time sequence of digital images into a plurality of sub-image time sequences;
    calculating mean intensity value and image gradient magnitude over both space and time for each sub-image time sequence;
    coding visually significant sub-image sequences according to their respective mean intensity value, gradient magnitude and gradient orientation, wherein said coding comprises:
        coding uniform and changing edge sub-image time sequences which have gradient magnitudes below a predetermined minimum for the duration of the respective time sequence according to only the respective mean intensity values,
        coding moving edge sub-image time sequences which have gradient magnitudes less than a predetermined minimum for a first time interval of said respective time sequence according to only the respective mean intensity value,
        coding moving edge sub-image time sequences which have gradient magnitudes above a predetermined minimum for a second time interval of said respective time sequence according to the respective mean intensity value, gradient magnitude, and gradient orientation, and
        coding static edge sub-image time sequences which have gradient magnitudes above a predetermined minimum for the duration of the respective time sequence according to the respective mean intensity value, gradient magnitude, and gradient orientation;
    transmitting and receiving coded sub-image time sequences;
    decoding said coded sub-image time sequences using said mean intensity value gradient magnitude and gradient orientation to produce a plurality of decoded sub-image time sequences; and
    arranging said decoded sub-image time sequences in both space and time to substantially reproduce said time sequence of digital images.

2. The method as recited in claim 1, further comprising:
    transmitting and receiving said coded uniform sub-image time sequence, said changing edge sub-image time sequences, said moving edge sub-image sequences and said static edge sub-image time sequences; and
    decoding said coded uniform sub-image time sequences, said changing edge sub-image time sequences, said moving sub-image sequences and said static edge sub-image time sequences.

3. The method as recited in claim 2, wherein decoding said coded uniform sub-image time sequences, said changing edge sub-image sequences, said moving edge time sub-image sequences and said static edge sub-image time sequences further comprising:
    creating a uniform space-time sequence cube for each coded uniform sub-image time sequence each coded changing edge sub-image time sequence and each coded moving sub-image sequence during said first time interval according to said respective mean intensity value;
    generating a non-uniform space-time sequence cube for each coded moving edge sub-image time sequence during said second time interval and for each coded static edge sub-image time sequence from a respective visual space-time image code;
    multiplying said non-uniform space-time sequence code by said gradient magnitude to produce a scaled space-time sequence cube; and
    adding said uniform space-time sequence cube to said scaled space-time sequence cube to produce said decoded sub-image time sequences.

4. The method as recited in claim 1, wherein said steps of coding moving edge sub-image time sequences during said second time interval and static edge sub-image time sequences both of which have gradient magnitudes above a predetermined minimum, further comprise matching in both space and time said gradient orientation with visual space-time image code information stored in a visual space-time pattern library.

5. A method of processing a time sequence of color images, comprising the steps of:
    separating a time sequence of color image into a plurality of sequences of chromatic images;
    partitioning each of said time sequence of chromatic images into a plurality of sub-image time sequences;
    processing one of said plurality of sequences of chromatic images by:
        selecting uniform sub-image time sequences, changing edge sub-image time sequences, first and second time interval moving edge sub-image time sequences and static edge sub-image time sequences according to visually perceptible discontinuity;
        coding said uniform sub-image time sequences according to only respective mean intensity values;
        coding said changing edge sub-image time sequences and said first time interval portions of moving edge sub-image time sequences according to respective mean intensity values;

coding said second time interval portions of moving edge sub-image time sequences according to respective mean intensity value, gradient magnitude, and gradient orientation;

coding said static edge sub-image time sequences according to respective mean intensity value, gradient magnitude, and gradient orientation;

processing all others of said plurality of time sequences of chromatic images by coding each sub-images time sequence according to mean intensity value;

transmitting and receiving said coded sub-image time sequences;

decoding received coded sub-image time sequences using said mean intensity value and gradient orientation to produce a plurality of decoded chromatic sub-image time sequences; and combining said plurality of decoded chromatic sub-image time sequences with all others of said plurality of time sequences to produce a decoded time sequence of color images.

6. The method as recited in claim 5, said plurality of sequences of chromatic images comprising red, green and blue color separated images, and wherein said one of said plurality of sequences of chromatic images comprises a sequence of said green image.

7. The method as recited in claim 5, wherein said plurality of time sequences of chromatic images comprising luminance, hue and saturation images, and wherein said one of said plurality of sequences of chromatic images comprises a sequence of said luminance image.

8. A method of coding a time sequence of digital images according to a hierarchical scheme, comprising:

generating, from a time sequence of digital images, a plurality of resolution levels k, each level having a plurality of sub-image sequences N, where $K=1,2,3\ldots$ and $N=4k^2$ and each level k being a representation, at a lower resolution than level $k+1$, of substantially all of said time sequence of digital images;

computing mean intensity value and image gradient magnitude over both space and time for a lowest resolution level ($k=1$) of said plurality of resolution levels;

coding first level sub-image time sequences at said lowest resolution level according to respective gradient magnitudes;

converting said coded first level sub-image time sequences to an expanded sub-image sequence at the next to lowest resolution level ($k=2$);

calculating residual sub-image time sequences at the next to lowest resolution level ($k=2$) by subtracting said expanded second level sub-image sequence from an actual sub-image time sequence at the next to lowest resolution level ($k=2$);

repeating said converting and calculating steps to derive expanded sub-image sequences and residual sub-image sequences for each resolution level up to and including a desired highest resolution level; and coding residual sub-image time sequences at each resolution level according to their respective gradient magnitudes.

9. The method as recited in claim 8, further comprising transmitting and receiving said coded residual sub-image time sequences and expanded sub-image sequences at each resolution level over a communication channel.

10. The method as recited in claim 8, further comprising:

transmitting and receiving said coded first level sub-image time sequences;

decoding said coded first level sub-image time sequences using said mean intensity value and gradient orientation to produce a plurality of decoded sub-image time sequences; and arranging said decoded first level sub-image time sequences in both space and time to substantially reproduce said sequence of digital images.

11. The method as recited in claim 8, further comprising:

transmitting and receiving said coded residual sub-image time sequences and expanded sub-image time sequences at each resolution level;

decoding said coded residual sub-image time sequences at each resolution level;

adding said decoded residual sub-image time sequences and said expanded sub-image time sequences at each respective resolution level to produce a plurality of decoded sub-image time sequences; and arranging said decoded sub-image time sequences in both space and time to substantially reproduce said time sequence of digital images.

12. The method as recited in claim 8, wherein the desired highest resolution level of said repeating step is that level where residual sub-image time sequences substantially corresponds with respective actual sub-image time sequences at said desired resolution level.

13. The method as recited in claim 8, further comprising:

generating a coded octree from said coded residual sub-image time sequences based upon whether there is visually significant detail within each said sub-image time sequence.

14. A method of coding a time sequence of digital images according to a hierarchical scheme, comprising:

partitioning a time sequence of digital images into a plurality of sub-image sequences N, where $k=1,2,3\ldots$ and $N=4k^2$;

computing mean intensity value and image gradient magnitude over both space and time for a lowest resolution level ($k=1$) of said plurality of resolution levels;

coding first level sub-image time sequences at said lowest resolution level according to respective gradient magnitudes;

converting said coded first level sub-image time sequences to an expanded sub-image sequence at the next to lowest resolution level ($k=2$);

calculating residual sub-image time sequences at the next to lowest resolution level ($k=2$) by subtracting said expanded second level sub-image sequence from an actual sub-image time sequence at the next to lowest resolution level ($k=2$);

repeating said converting and calculating steps to derive expanded sub-image sequences and residual sub-image sequences for each resolution level up to and including a desired highest resolution level, wherein determining the desired highest resolution level comprises:

producing an octree of said coded residual sub-images at each resolution level, comparing said octree with respective said actual sub-image time sequences, and determining desired highest resolution level having a difference between said octree and respective actual sub-image time sequence less than a predetermined amount; and coding residual sub-image time sequences at each resolution level according to their respective gradient magnitudes.

15. The method as recited in claim 14, further comprising inputting a user defined octree of a localized region in sufficient space-time detail.

16. A method of processing a time sequence of digital images, comprising:

partitioning a time sequence of digital images into a plurality of sub-image time sequences by, dividing said time sequence of digital images into a plurality of equally sized sub-image time sequences;

calculating mean intensity value and image gradient magnitude over both space and time for each sub-image time sequence;

coding visually significant sub-image time sequences according to their respective mean intensity value, gradient magnitude and gradient orientation by,
coding sub-image time sequences having a gradient magnitude less than a predetermined minimum according to their respective mean intensity value only, and
coding sub-image time sequences having a gradient magnitude greater than a predetermined minimum according to their mean intensity value, gradient magnitude and gradient orientation;

transmitting and receiving coded sub-image time sequences;

decoding said coded sub-image time sequences using said mean intensity value gradient magnitude and gradient orientation to produce a plurality of decoded sub-image time sequences; and arranging said decoded sub-image time sequences in both space and time to substantially reproduce said time sequence of digital images.

* * * * *

UNITED STATES PATENT AND TRADEMARK OFFICE
CERTIFICATE OF CORRECTION

PATENT NO.   :   5,282,255

DATED        :   January 25, 1994

INVENTOR(S)  :   Bovik *et al.*

It is certified that error appears in the above-identified patent and that said Letters Patent is hereby corrected as shown below:

Title page,
In the Inventors field [75] after "Tex." insert --; Peter L. Silsbee, Virginia Beach, Va.--

In claim 1, column 31, line 41, after "sub-image" insert --time--.

In claim 2, column 32, line 11, delete "sequence" and insert --sequences--.

In claim 3, column 32, line 37, delete "code" and insert --cube--.

In claim 14, column 34, line 42, after "of" insert --resolution levels k, each level having a plurality of--.

Signed and Sealed this

Ninth Day of August, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,282,255
DATED : January 25, 1994
INVENTOR(S) : Bovik *et al.*

It is certified that error appears in the above-indentified patent and that said Letters Patent is hereby corrected as shown below:

In claim 5, column 33, line 11, delete "sub-images" and insert --sub-image--.

In claim 5, column 32, line 52, delete "image" and insert --images--.

Signed and Sealed this

Thirteenth Day of December, 1994

*Attest:*

BRUCE LEHMAN

*Attesting Officer*  *Commissioner of Patents and Trademarks*